United States Patent
Negishi et al.

(10) Patent No.: US 9,302,930 B2
(45) Date of Patent: Apr. 5, 2016

(54) OPTICAL GLASS AND USE THEREOF

(71) Applicants: Tomoaki Negishi, Hino (JP); Toshiyuki Nishikawa, Akishima (JP)

(72) Inventors: Tomoaki Negishi, Hino (JP); Toshiyuki Nishikawa, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/381,771

(22) PCT Filed: Feb. 25, 2013

(86) PCT No.: PCT/JP2013/054733
§ 371 (c)(1),
(2) Date: Aug. 28, 2014

(87) PCT Pub. No.: WO2013/129302
PCT Pub. Date: Sep. 6, 2013

(65) Prior Publication Data
US 2015/0045204 A1 Feb. 12, 2015

(30) Foreign Application Priority Data
Feb. 28, 2012 (JP) .................. 2012-041736

(51) Int. Cl.
C03C 3/068 (2006.01)
C03B 11/00 (2006.01)
C03B 11/08 (2006.01)
G02B 1/02 (2006.01)
G02B 3/00 (2006.01)
C03B 40/02 (2006.01)
C03B 5/43 (2006.01)
C03B 17/04 (2006.01)
C03B 17/06 (2006.01)

(52) U.S. Cl.
CPC . *C03C 3/068* (2013.01); *C03B 5/43* (2013.01); *C03B 11/08* (2013.01); *C03B 17/04* (2013.01); *C03B 17/061* (2013.01); *C03B 40/02* (2013.01); *G02B 1/02* (2013.01); *G02B 3/00* (2013.01); *C03B 2215/46* (2013.01)

(58) Field of Classification Search
CPC .......... C03C 3/068; C03B 11/00; C03B 11/08
See application file for complete search history.

(56) References Cited

U.S. PATENT DOCUMENTS

| | | | |
|---|---|---|---|
| 2004/0145815 A1* | 7/2004 | Endo | 359/642 |
| 2007/0015651 A1* | 1/2007 | Endo | 501/50 |
| 2009/0042711 A1* | 2/2009 | Zou et al. | 501/64 |
| 2011/0263410 A1* | 10/2011 | Negishi et al. | 501/78 |
| 2014/0287906 A1* | 9/2014 | Kuang | 501/78 |

FOREIGN PATENT DOCUMENTS

| | | | |
|---|---|---|---|
| CN | 102225844 A | * | 10/2011 |
| CN | 102503121 A | * | 6/2012 |
| JP | A-60-33229 | | 2/1985 |
| JP | A-2010-30879 | | 2/2010 |
| JP | 2010-285341 A | | 12/2010 |
| JP | 2011-136870 A | | 7/2011 |
| JP | 2011153048 A | * | 8/2011 |
| WO | WO 2010/053214 A1 | | 5/2010 |

OTHER PUBLICATIONS

International Search Report issued in International Application No. PCT/JP2013/054733 mailed on May 28, 2013 (with translation).
International Preliminary Report on Patentability issued in International Application No. PCT/JP2013/054733 issued on Sep. 2, 2014 (with translation).
Aug. 18, 2015 Office Action issued in Japanese Patent Application No. 2014-502201.

* cited by examiner

*Primary Examiner* — Elizabeth A Bolden
(74) *Attorney, Agent, or Firm* — Oliff PLC

(57) ABSTRACT

An aspect of the present invention relates to optical glass, which is oxide glass, having a refractive index nd ranging from 1.95 to 2.50 and an Abbé number vd ranging from 18 to 40, including essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$, including, denoted as cation %, 1 to 30% of $Si^{4+}$, 1 to 50% of $B^{3+}$, wherein a total of $Si^{4+}$ and $B^{3+}$ ranges from 5 to 55%, a total of 11 to 70% of $La^{3+}$, $Gd^{3+}$, $Y^{3+}$, and $Yb^{3+}$, with 10 to 50% of $La^{3+}$, a total of 23 to 70% of $Ti^{4+}$, $Nb^{5+}$, $Ta^{5+}$, and $W^{6+}$, with equal to or greater than 1% of $Nb^{5+}$ and greater than 22% of $Ti^{4+}$.

16 Claims, No Drawings

OPTICAL GLASS AND USE THEREOF

CROSS-REFERENCE TO RELATED APPLICATIONS

This application claims the benefit of priority to Japanese Patent Application No. 2012-041736 filed on Feb. 28, 2012, which is expressly incorporated herein by reference in its entirety.

TECHNICAL FIELD

The present invention relates to optical glass with high refractive index and low dispersion characteristics, a press molding glass gob comprised of the above optical glass, an optical element blank and method of manufacturing the same, and an optical element and method of manufacturing the same.

BACKGROUND ART

By combining a lens comprised of high refractive index, low dispersion glass with a lens comprised of an ultra-low dispersion glass, it is possible to achieve a compact optical system while correcting for chromatic aberration. Thus, such lenses perform an extremely important role as optical elements in image pickup optical systems and projecting optical systems such as projectors.

Japanese Unexamined Patent Publication (KOKAI) Showa No. 60-33229, which is expressly incorporated herein by reference in its entirety, discloses a high refractive index, low dispersion glass which, while not being an optical element material for image pickup optical systems or projecting optical systems, has a refractive index of 1.90 to 2.10 and an Abbé number vd of 22 to 35.

By the way, in high refractive index, low dispersion glasses, the quantity of glass network-forming components that contribute to stabilizing the glass should be decreased to increase the quantity of components that raise the refractive index. Thus, glass stability may decrease and there are cases where phenomena such as a tendency to devitrify occur in the manufacturing process.

Further, when the quantity of components that raise the refractive index is increased, the melting temperature should be raised to obtain a homogeneous glass. There are also problems in that materials making up the melting vessel, such as platinum, leach out into the glass melt and glass coloration becomes pronounced. Further, the thermal stability of the glass decreases and the glass tends to devitrify.

SUMMARY OF THE INVENTION

An aspect of the present invention provides for optical glass having good glass stability and little coloration that is also a high refractive index, low dispersion glass.

The present inventors conducted extensive research, resulting in the discovery that by adjusting the glass composition, or by ensuring that the refractive index and liquidus temperature satisfied a prescribed relation, it was possible to obtain optical glass of high stability and reduced coloration that was also a high refractive index and low dispersion glass.

An aspect of the present invention relates to optical glass, which is oxide glass, having a refractive index nd ranging from 1.95 to 2.50 and an Abbé number vd ranging from 18 to 40;

comprising essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$;

comprising, denoted as cation %, 1 to 30% of $Si^{4+}$;

1 to 50% of $B^{3+}$, wherein a total of $Si^{4+}$ and $B^{3+}$ ranges from 5 to 55%;

a total of 11 to 70% of $La^{3+}$, $Gd^{3+}$, $Y^{3+}$, and $Yb^{3+}$, with 10 to 50% of $La^{3+}$;

a total of 23 to 70% of $Ti^{4+}$, $Nb^{5+}$, $Ta^{5+}$, and $W^{6+}$, with equal to or greater than 1% of $Nb^{5+}$ and greater than 22% of $Ti^{4+}$;

wherein a cation ratio of a content of $Y^{3+}$ to a total content of $Gd^{3+}$, $Y^{3+}$, and $Yb^{3+}$, $Y^{3+}/(Gd^{3+}+Y^{3+}+Yb^{3+})$, is equal to or less than 0.60; and wherein a cation ratio of a content of $W^{6+}$ to a total content of $Ti^{4+}$, $Nb^{5+}$, $Ta^{5+}$, and $W^{6+}$, $W^{6+}/(Ti^{4+}+Nb^{5+}+Ta^{5+}+W^{6+})$, is less than 0.10.

In an embodiment, the cation ratio of the $Ti^{4+}$ content to the $B^{3+}$ content ($Ti^{4+}/B^{3+}$) in the optical glass is equal to or greater than 0.85.

In an embodiment, the optical glass contains equal to or greater than 1 cation % of $Zr^{4+}$.

In an embodiment, the relation between the liquidus temperature LT and the refractive index nd satisfies the following expression (1):

$$LT/(nd-1) \leq 1250° C. \quad (1)$$

In an embodiment, the $Ge^{4+}$ content of the optical glass ranges from 0 to 6 cation %.

In an embodiment, the $Bi^{3+}$ content of the optical glass ranges from 0 to 10 cation %.

In an embodiment, the optical glass contains essentially no Pb.

A further aspect of the present invention relates to optical glass, which has a refractive index nd ranging from 1.95 to 2.50 and an Abbé number vd ranging from 18 to 40, and wherein a liquidus temperature LT and refractive index nd satisfies a relation of the above expression (1).

A further aspect of the present invention relates to optical glass, which is oxide glass, having a refractive index nd ranging from 1.95 to 2.50 and an Abbé number vd ranging from 18 to 40;

comprising essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$;

comprising, denoted as cation %, 1 to 30% of $Si^{4+}$;

1 to 50% of $B^{3+}$, wherein a total of $Si^{4+}$ and $B^{3+}$ ranges from 5 to 55%;

a total of 11 to 70% of $La^{3+}$, $Gd^{3+}$, $Y^{3+}$, and $Yb^{3+}$, with 10 to 50% of $La^{3+}$; and a total of 23 to 70% of $Ti^{4+}$, $Nb^{5+}$, $Ta^{5+}$, and $W^{6+}$, with equal to or greater than 1% of $Nb^{5+}$ and greater than 22% of $Ti^{4+}$;

wherein a cation ratio of a content of $Y^{3+}$ to a total content of $Gd^{3+}$, $Y^{3+}$, and $Yb^{3+}$, $Y^{3+}/(Gd^{3+}+Y^{3+}+Yb^{3+})$, is equal to or less than 0.60.

A further aspect of the present invention relates to a press-molding glass gob comprised of the optical glass of one of the above aspects.

A further aspect of the present invention relates to an optical element blank comprised of the optical glass of one of the above aspects.

A further aspect of the present invention relates to an optical element comprised of the optical glass of one of the above aspects.

A further aspect of the present invention relates to a method of manufacturing optical glass comprising:

melting glass starting materials by heating, and molding the glass melt obtained;

blending the glass starting materials to obtain the optical glass of one of the above aspects; and conducting the above melting in a glass melting vessel made of platinum or a platinum alloy.

A further aspect of the present invention relates to a method of manufacturing an optical element blank that is to be finished into an optical element by grinding and polishing, which comprises:

softening by heating and then press molding the press-molding glass gob of the above aspect.

A further aspect of the present invention relates to a method of manufacturing an optical element blank that is to be finished into an optical element by grinding and polishing, which comprises:

melting glass starting materials by heating and press molding the glass melt that has been obtained to prepare an optical element blank of the above aspect.

A further aspect of the present invention relates to a method of manufacturing an optical element, which comprises preparing an optical element by processing the optical element blank of the above aspect.

A further aspect of the present invention relates to a method of manufacturing an optical element, which comprises:

preparing an optical element blank by the method of one of the above aspects and processing the optical element blank that has been prepared to obtain an optical element.

An aspect of the present invention can provide optical glass comprised of high refractive index, low dispersion glass, having good glass stability and having relatively little coloration, and a method of manufacturing the same. It can also provide a press-molding glass gob, an optical element blank, and an optical element comprised of the above optical glass; and methods of manufacturing an optical element blank and an optical element.

With the above optical element and the optical elements prepared from the above press-molding glass gob and optical element blank—with lenses, for example—, it is possible to provide a compact optical system for correcting chromatic aberration by combining lenses made of high refractive index, high dispersion glasses.

Based on an aspect of the present invention, it is possible to provide optical glass that is suited to high-order chromatic correction and has a lower partial dispersion ratio Pg,F than glass of identical or similar Abbé number while having the above optical characteristics. Utilizing such properties, combination with optical elements comprised of high refractive index, high dispersion optical glasses makes it possible to provide an optical system suited to high-order chromatic aberration correction.

MODE FOR CARRYING OUT THE INVENTION

Optical Glass I

An aspect of the optical glass of the present invention (referred to as "optical glass I", hereinafter) has a refractive index nd ranging from 1.95 to 2.50 and an Abbé number vd ranging from 18 to 40; comprises essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$; comprises, denoted as cation %, 1 to 30% of $Si^{4+}$; 1 to 50% of $B^{3+}$ (where the total of $Si^{4+}$ and $B^{3+}$ is 5 to 55%); a total of 11 to 70% of $La^{3+}$, $Gd^{3+}$, $Y^{3+}$, and $Yb^{3+}$ (where $La^{3+}$ is 10 to 50%); and a total of 23 to 70% of $Ti^{4+}$, $Nb^{5+}$, $Ta^{5+}$, and $W^{6+}$ (with equal to or greater than 1% of $Nb^{5+}$ and greater than 22% of $Ti^{4+}$); wherein the cation ratio of the content of $Y^{3+}$ to the total content of $Gd^{3+}$, $Y^{3+}$, and $Yb^{3+}$ [$Y^{3+}/(Gd^{3+}+Y^{3+}+Yb^{3+})$] is equal to or less than 0.60; and wherein the cation ratio of the content of $W^{6+}$ to the total content of $Ti^{4+}$, $Nb^{5+}$, $Ta^{5+}$, and $W^{6+}$ [$W^{6+}/(Ti^{4+}+Nb^{5+}+Ta^{5+}+W^{6+})$] is less than 0.10.

Other aspects of the optical glass of the present invention (optical glasses II and III) will be set forth below.

Optical glass I will be described in greater detail below.

The reasons for the above specified composition ranges will be described below. Unless specifically stated otherwise, the contents and total contents of the various components are given as cation %.

$Si^{4+}$ is an essential component in the form of a network-forming oxide that can effectively maintain glass stability, maintain the glass melt at a suitable viscosity for molding, and enhance chemical durability. When the content is less than 1%, the above effects are not achieved, and when the quantity exceeds 30%, it becomes difficult to achieve the desired refractive index and both the liquidus temperature and glass transition temperature end up rising. There are also problems in that it becomes difficult to achieve the desired Abbé number, the melting property of the glass deteriorates, resistance to devitrification deteriorates, and the like. Accordingly, the $Si^{4+}$ content is set to 1 to 30%. The upper limit of the $Si^{4+}$ content is desirably 25%, preferably 20%, more preferably 18%, still more preferably 15%, and yet more preferably, 12%. To achieve the above effects of $Si^{4+}$, the lower limit of the $Si^{4+}$ content is desirably 2%, preferably 3%, more preferably 4%, still more preferably 5%, and yet more preferably, 6%.

$B^{3+}$ is an essential component in the form of a network-forming oxide that can effectively maintain the melting property of the glass, lower the liquidus temperature, increase glass stability, and reduce dispersion. At a content of less than 1%, the stability of the glass decreases and the above effects are not achieved. At a content exceeding 50%, it becomes difficult to achieve the desired refractive index and chemical durability deteriorates. Accordingly, the $B^{3+}$ content is set to 1 to 50%. The upper limit of the $B^{3+}$ content is desirably 40%, preferably 35%, more preferably 30%, still more preferably 25%, yet more preferably 22%, and yet still more preferably, 20%. The lower limit of the $B^{3+}$ content is desirably 3%, preferably 5%, more preferably 7%, still more preferably 9%, and yet more preferably, 11%.

When the combined content of $Si^{4+}$ and $B^{3+}$ is less than 5%, the glass stability deteriorates and the liquidus temperature rises. When the combined content exceeds 55%, it becomes difficult to achieve the desired refractive index. Accordingly, the combined content of $Si^{4+}$ and $B^{3+}$ is set to 5 to 55%. The upper limit of the combined content of $Si^{4+}$ and $B^{3+}$ is desirably 50%, preferably 45%, more preferably 40%, still more preferably 35%, and yet more preferably, 30%. The lower limit of the combined content of $Si^{4+}$ and $B^{3+}$ is desirably 10%, preferably 13%, more preferably 15%, still more preferably 18%, and yet more preferably, 20%.

$La^{3+}$, $Gd^{3+}$, $Y^{3+}$, and $Yb^{3+}$ are components that raise the refractive index, lower dispersion, and enhance chemical durability. At a total content of $La^{3+}$, $Gd^{3+}$, $Y^{3+}$, and $Yb^{3+}$ of less than 11%, it becomes difficult to obtain the desired refractive index and Abbé number. At a total content exceeding 70%, glass stability deteriorates and the liquidus temperature rises. Accordingly, the total content of $La^{3+}$, $Gd^{3+}$, $Y^{3+}$, and $Yb^{3+}$ is set to 11 to 70%. The upper limit of the total content of $La^{3+}$, $Gd^{3+}$, $Y^{3+}$, and $Yb^{3+}$ is desirably 60%, preferably 50%, more preferably 45%, still more preferably 40%, yet more preferably 38%, and yet still more preferably, 36%. The lower limit of the total content of $La^{3+}$, $Gd^{3+}$, $Y^{3+}$, and $Yb^{3+}$ is desirably 15%, preferably 20%, more preferably 23%, still more preferably 25%, yet more preferably 28%, and yet still more preferably, 30%.

$La^{3+}$ is an essential component that can effectively raise the refractive index and lower dispersion well while maintaining glass stability. When the $La^{3+}$ content is less than 10%, it tends not to have these effects. When the $La^{3+}$ exceeds 50%, resistance to devitrification deteriorates and the liquidus temperature rises. Accordingly, the $La^{3+}$ content is set to 10 to 50%. The upper limit of the $La^{3+}$ content is desirably 45%, preferably 40%, more preferably 35%, and still more preferably, 33%. The lower limit of the $La^{3+}$ is desirably 15%, preferably 18%, more preferably 20%, still more preferably 22%, and yet more preferably, 24%.

Subtracting the amount of the $La^{3+}$ content from the total content of $La^{3+}$, $Gd^{3+}$, $Y^{3+}$, and $Yb^{3+}$ gives the total content of $Gd^{3+}$, $Y^{3+}$, and $Yb^{3+}$. To maintain glass stability and achieve a higher refractive index and lower dispersion while inhibiting a rise in the liquidus temperature, the cation ratio of the $Y^{3+}$ content to the total content of $Gd^{3+}$, $Y^{3+}$, and $Yb^{3+}$ [$Y^{3+}$/($Gd^{3+}+Y^{3+}+Yb^{3+}$)] is set to equal to or less than 0.60. The upper limit of the cation ratio [$Y^{3+}$/($Gd^{3+}+Y^{3+}+Yb^{3+}$)] is desirably 0.55, preferably 0.50, more preferably 0.45, and still more preferably, 0.30. The lower limit is desirably 0.01, preferably 0.03, more preferably 0.04, still more preferably 0.05, yet more preferably 0.06, and yet still more preferably, 0.07.

In optical glass I, at least one from among $Gd^{3+}$, $Y^{3+}$, and $Yb^{3+}$ is an essential component. To enhance the above effects, the total content of $Gd^{3+}$, $Y^{3+}$, and $Yb^{3+}$ is desirably equal to or greater than 1.0%. Having any of $Gd^{3+}$, $Y^{3+}$, and $Yb^{3+}$ present with $La^{3+}$ functions to lower the liquidus temperature and greatly improve resistance to devitrification. To enhance this effect, the total content of $Gd^{3+}$, $Y^{3+}$, and $Yb^{3+}$ is desirably equal to or greater than 1.5%, preferably equal to or greater than 2.0, more preferably equal to or greater than 2.5 percent, still more preferably equal to or greater than 3.0%, and yet more preferably, equal to or greater than 3.5%. The upper limit of the total content of $Gd^{3+}$, $Y^{3+}$, and $Yb^{3+}$ is desirably 35%, preferably 30%, more preferably 25%, still more preferably 20%, yet more preferably 15%, yet still more preferably, 10%, and even more preferably, 7%.

To lower the liquidus temperature and enhance resistance to devitrification, the upper limit of the $Gd^{3+}$ content is desirably 20%, preferably 15%, more preferably 10%, still more preferably 8%, and yet more preferably, 6%. The lower limit of the $Gd^{3+}$ content is desirably 0.5%, preferably 1%, more preferably 2%, and still more preferably 3%. The $Gd^{3+}$ content can also be 0%.

The upper limit of the $Y^{3+}$ content is desirably 15%, preferably 10%, more preferably 7%, still more preferably 5%, yet more preferably 3%, and yet still more preferably, 2%. The lower limit of the $Y^{3+}$ content is desirably 0.1%. The $Y^{3+}$ content can also be 0%.

The upper limit of the $Yb^{3+}$ content is desirably 10%, preferably 8%, more preferably 6%, still more preferably 4%, and yet more preferably, 2%. The $Yb^{3+}$ content can also be 0%. Since $Yb^{3+}$ absorbs light in the infrared region, it is not suited to use in highly sensitive optical systems which are required to have photosensitive properties in the near infrared region, such as high precision video cameras, surveillance cameras, and the like. Glasses of reduced $Yb^{3+}$ content are suitable for such applications.

$Ti^{4+}$, $Nb^{5+}$, $Ta^{5+}$ and $W^{6+}$ enhance resistance to devitrification, inhibit a rise in the liquidus temperature, and enhance chemical durability while raising the refractive index. When the total content of $Ti^{4+}$, $Nb^{5+}$, $Ta^{5+}$ and $W^{6+}$ is less than 23%, it becomes difficult to achieve the above effects. When the total content of $Ti^{4+}$, $Nb^{5+}$, $Ta^{5+}$ and $W^{6+}$ exceeds 70%, the resistance to devitrification deteriorates and the liquidus temperature rises. Dispersion also rises and glass coloration intensifies. Accordingly, the total content of $Ti^{4+}$, $Nb^{5+}$, $Ta^{5+}$ and $W^{6+}$ is set to 23 to 70%. The upper limit of the total content of is desirably 60%, preferably 55%, more preferably 50%, still more preferably 45%, and yet more preferably, 40%. The lower limit of the total content of $Ti^{4+}$, $Nb^{5+}$, $Ta^{5+}$ and $W^{6+}$ is desirably 24%, preferably 25%, more preferably 26%, still more preferably 27%, and yet more preferably, 28%.

While keeping the total content of $Ti^{4+}$, $Nb^{5+}$, $Ta^{5+}$ and $W^{6+}$ within the above range, the $Ti^{4+}$ content is kept to greater than 22% and the $Nb^{5+}$ content is kept to equal to or greater than 1%. By keeping $Ti^{4+}$ and $Nb^{5+}$, which are both essential components, in a prescribed balance in this manner, it is possible to further improve resistance to devitrification. It is also effective for inhibiting a rise in the liquidus temperature.

The lower limit of the $Ti^{4+}$ content is desirably 22.5%, preferably 23%, and more preferably, 24%. The upper limit of the $Ti^{4+}$ content is desirably 60%, preferably 50%, more preferably 45%, still more preferably 40%, yet more preferably 35%, and yet still more preferably, 30%.

The lower limit of the $Nb^{5+}$ content is desirably 2%, preferably 3%, more preferably 4%, and still more preferably, 5%. The upper limit of the $Nb^{5+}$ content is desirably 30%, preferably 25%, still more preferably 20%, still more preferably 15%, yet more preferably 10%, and yet still more preferably, 8%.

$Ta^{5+}$ functions to raise the refractive index without increasing dispersion and enhance the stability of the glass better than $Ti^{4+}$, $Nb^{5+}$, and $W^{6+}$. When the content of $Ta^{5+}$ exceeds 10%, the liquidus temperature rises and the resistance to devitrification decreases. The $Ta^{5+}$ content is desirably kept to 0 to 10%. When the fact that $Ta^{5+}$ is an expensive component is taken into account, the $Ta^{5+}$ content is desirably kept to within a range of 0 to 8%, preferably to within a range of 0 to 6%, more preferably to within a range of 0 to 4%, still more preferably to within a range of 0 to 2%, yet more preferably to within a range of 0 to 1%, and yet still more preferably, no $Ta^{5+}$ is incorporated.

$W^{6+}$ is an optional element that raises the refractive index, lowers the liquidus temperature, and contributes to enhancing resistance to devitrification. To inhibit a rise in the liquidus temperature, enhance resistance to devitrification, and inhibit coloration of the glass, the content of $W^{6+}$ is desirably 0 to 10%. The content of $W^{6+}$ desirably falls within a range of 0 to 8%, preferably within a range of 0 to 6%, more preferably within a range of 0 to 4%, still more preferably within a range of 0 to 2%, yet more preferably within a range of 0 to 1%, and yet still more preferably, no $W^{6+}$ is incorporated.

To raise the refractive index while maintaining glass stability, it is desirable for the cation ratio of the content of $W^{6+}$ to the total content of $Ti^{4+}$, $Nb^{5+}$, $Ta^{5+}$, and $W^{6+}$[$W^{6+}$/($Ti^{4+}+Nb^{5+}+Ta^{5+}+W^{6+}$)] to be less than 0.10. When the cation ratio [$W^{6+}$/($Ti^{4+}+Nb^{5+}+Ta^{5+}+W^{6+}$)] is equal to or greater than 0.10, crystals tend to precipitate out during glass manufacturing.

To raise the refractive index while maintaining the stability of the glass, the upper limit of the cation ratio [$W^{6+}$/($Ti^{4+}+Nb^{5+}+Ta^{5+}+W^{6+}$)] is preferably equal to or less than 0.095, more preferably equal to or less than 0.090, still more preferably equal to or less than 0.070, yet more preferably equal to or less than 0.050, and yet still more preferably, equal to or less than 0.030. The lower limit of the cation ratio [$W^{6+}$/($Ti^{4+}+Nb^{5+}+Ta^{5+}+W^{6+}$)] is 0.

To raise the refractive index while maintaining glass stability, the cation ratio of the content of $Ti^{4+}$ to the content of $B^{3+}$ ($Ti^{4+}/B^{3+}$) is desirably equal to or greater than 0.85. When the cation ratio ($Ti^{4+}/B^{3+}$) is less than 0.85, crystals tend to precipitate out during glass manufacturing.

To raise the refractive index while maintaining the glass stability, the lower limit of the cation ratio ($Ti^{4+}/B^{3+}$) is preferably equal to or greater than 0.90, more preferably equal to or greater than 0.95, and still more preferably, equal to or greater than 1.00. The upper limit of the cation ratio ($Ti^{4+}/B^{3+}$) is naturally determined by the compositional range of the optical glass of the aspect set forth above. However, it can be thought of as being about 10, for example.

$Zr^{4+}$ serves to raise the refractive index and enhance chemical durability. It also serves in conjunction with $Ti^{4+}$ to enhance resistance to devitrification and inhibit a rise in the liquidus temperature. To achieve the above effects, the $Zr^{4+}$ content is desirably equal to or greater than 1%. From the perspectives of raising the glass transition temperature and liquidus temperature and inhibiting a drop in resistance to devitrification, the upper limit of the $Zr^{4+}$ content is desirably 15%. The upper limit of the $Zr^{4+}$ content is preferably 10%, more preferably 8%, and still more preferably, 7%. The lower limit of the $Zr^{4+}$ content is desirably 1%, preferably 2%, more preferably 3%, and still more preferably, 4%.

$Zn^{2+}$ lowers the refractive index and glass stability, but serves to improve the meltability and clarification property of the glass. Each of the oxides $La^{3+}$, $Gd^{3+}$, $Y^{3+}$, $Yb^{3+}$, $Ti^{4+}$, $Nb^{5+}$, $Ta^{5+}$, $W^{6+}$, and $Zr^{4+}$ has an extremely high melting point. In optical glass I, which contains these components as essential components or optional components, it is desirable to incorporate $Zn^{2+}$, which can effectively improve meltability and the clarification property. Accordingly, to maintain a high refractive index and good glass stability, the $Zn^{2+}$ content is desirably kept to equal to or less than 15%, preferably to equal to or less than 12%, more preferably to equal to or less than 10%, still more preferably to equal to or less than 8%, yet more preferably to equal to or less than 6%, and yet still more preferably, to equal to or less than 3%. From the viewpoints of enhancing the meltability and clarification property of the glass, inhibiting a rise in the melting temperature, and inhibiting an associated increase in glass coloration, the $Zn^{2+}$ content is desirably kept to equal to or greater than 0.1%, preferably to equal to or greater than 0.5%, more preferably to equal to or greater than 0.8%, and still more preferably, to equal to or greater than 1.0%. It is also possible for the $Zn^{2+}$ content to be 0%.

Although $Ti^{4+}$, $Nb^{5+}$, $Ta^{5+}$, and $W^{6+}$ raise the refractive index, they are also components that raise the melting temperature. It is possible to adjust meltability, clarification property, and optical characteristics such as the refractive index using an index in the form of the cation ratio of the content of $Zn^{2+}$, which lowers the refractive index but improves meltability and the clarification property, to the total content of these components, $Zn^{2+}/(Ti^{4+}+Nb^{5+}+Ta^{5+}+W^{6+})$. To enhance the meltability and the clarification property of the glass, the cation ratio [$Zn^{2+}/(Ti^{4+}+Nb^{5+}+Ta^{5+}+W^{6+})$] is desirably kept to equal to or greater than 0.01, preferably equal to or greater than 0.02, more preferably equal to or greater than 0.03, and still more preferably, equal to or greater than 0.04. To raise the refractive index, the cation ratio [$Zn^{2+}/(Ti^{4+}+Nb^{5+}+Ta^{5+}+W^{6+})$] is desirably kept to equal to or less than 0.65, preferably to equal to or less than 0.60, more preferably to equal to or less than 0.50, still more preferably to equal to or less than 0.40, yet more preferably to equal to or less than 0.30, yet still more preferably to equal to or less than 0.20, and even more preferably, to equal to or less than 0.10.

$Li^+$, $Na^+$, and $K^+$ are optional components that function to improve meltability and lower the glass transition temperature. From the perspectives of inhibiting a raise in the liquidus temperature as well as a drop in glass stability and chemical durability while achieving a higher refractive index, the total content of $Li^+$, $Na^+$, and $K^+$ desirably falls within a range of 0 to 10%. The total content of $Li^+$, $Na^+$, and $K^+$ preferably falls within a range of 0 to 8%, more preferably within a range of 0 to 6%, still more preferably within a range of 0 to 4%, yet more preferably within a range of 0 to 2%, yet still more preferably within a range of 0 to 1%, and even more preferably, none of the above alkali metal components is incorporated.

The contents of each of the components $Li^+$, $Na^+$, and $K^+$ desirably fall within a range of 0 to 10%, preferably within a range of 0 to 8%, more preferably within a range of 0 to 6%, still more preferably within a range of 0 to 4%, yet more preferably within a range of 0 to 2%, yet still more preferably within a range of 0 to 1%, and even more preferably, none of these alkali metal components is incorporated.

$Mg^{2+}$, $Ca^{2+}$, $Sr^{2+}$, and $Ba^{2+}$ serve to improve the meltability of the glass and lower the glass transition temperature. Their incorporation into the glass in the form of nitrates and sulfates can achieve a defoaming effect. From the perspectives of preventing a rise in the liquidus temperature and inhibiting a drop in the resistance to devitrification, the refractive index, and chemical durability, the total content of $Mg^{2+}$, $Ca^{2+}$, $Sr^{2+}$, and $Ba^{2+}$ is desirably 0 to 10%. The total content of $Mg^{2+}$, $Ca^{2+}$, $Sr^{2+}$, and $Ba^{2+}$ preferably falls within a range of 0 to 8%, more preferably within a range of 0 to 6%, still more preferably within a range of 0 to 4%, yet more preferably within a range of 0 to 2%, yet still more preferably within a range of 0 to 1%, and even more preferably, none of the above alkaline earth metal components is incorporated.

The content of each of the components $Mg^{2+}$, $Ca^{2+}$, $Sr^{2+}$, and $Ba^{2+}$ desirably falls within a range of 0 to 10%, preferably within a range of 0 to 8%, more preferably within a range of 0 to 6%, still more preferably within a range of 0 to 4%, yet more preferably within a range of 0 to 2%, yet still more preferably within a range of 0 to 1%, and even more preferably, none of the above alkaline earth metal components is incorporated.

$Ge^{4+}$ is a network-forming oxide that serves to raise the refractive index. Thus, it is a component that can raise the refractive index while maintaining glass stability. However, compared to other components, it is significantly more expensive. It is thus a component the content of which is desirably kept low. Since the composition is established as set forth above in optical glass I, it is possible to both achieve desired optical characteristics and good glass stability even when the content of $Ge^{4+}$ is kept to, for example, equal to or less than 10%. Accordingly, it is desirable to keep the content of $Ge^{4+}$ to 0 to 10%. The content of $Ge^{4+}$ is preferably kept to within a range of 0 to 8%, more preferably to within a range of 0 to 6%, still more preferably to within a range of 0 to 4%, yet more preferably to within a range of 0 to 2%, and yet still more preferably, to within a range of 0 to 1%. It is particularly desirable to incorporate no $Ge^{4+}$, that is, for the glass to be free of Ge.

$Bi^{3+}$ serves to raise the refractive index and improve glass stability. However, when the quantity thereof exceeds 10%, light transmittance in the visible range decreases. Accordingly, the $Bi^{3+}$ content is desirably kept to 0 to 10%. The $Bi^{3+}$ content is preferably kept to within a range of 0 to 8%, more preferably to within a range of 0 to 6%, still more preferably to within a range of 0 to 4%, yet more preferably to within a range of 0 to 2%, and yet still more preferably, to within a range of 0 to 1%. It is particularly desirable to incorporate no $Bi^{3+}$.

$Al^{3+}$ serves to enhance glass stability and chemical durability in small quantities. However, when the quantity thereof exceeds 10%, the liquidus temperature rises and the resistance to devitrification tends to deteriorate. According, the $Al^{3+}$ content is desirably 0 to 10%. The $Al^{3+}$ content preferably falls within a range of 0 to 8%, more preferably within a range of 0 to 6%, still more preferably within a range of 0 to 4%, yet more preferably within a range of 0 to 2%, yet still more preferably within a range of 0 to 1%, and even more preferably, no $Al^{3+}$ is incorporated.

To provide optical glass I in the form of optical glass of high refractive index and low dispersion having good glass stability, the content of optional cation components other than the above cation components is desirably kept to 0 to 5%, preferably to 0 to 4%, more preferably to 0 to 3%, still more preferably to 0 to 2.5%, yet more preferably to 0 to 2%, even more preferably to 0 to 1.5%, yet even more preferably to 0 to 1.0%, and yet still even more preferably, to 0 to 0.5%. The content of optional cation components other than the above cation components can also be 0%.

Sb can be added as a clarifying agent. The addition of a small quantity serves to inhibit a drop in light transmittance due to the incorporation of impurities such as Fe. However, when more than 1 mass % is added as a ratio of the content when converted to the oxide $Sb_2O_3$ to the total content other than $Sb_2O_3$, the glass develops color or a powerful oxidation effect ends up promoting deterioration of the molding surface of the mold. Accordingly, the content of Sb added, as converted to $Sb_2O_3$, is desirably 0 to 1 mass %, preferably 0 to 0.5 mass %, and more preferably, 0 to 0.1 mass %, as the above ratio.

Sn can be added as a clarifying agent. However, when added in a quantity exceeding 1 mass % as a ratio of the content when converted to the oxide $SnO_2$ to the total content other than $SnO_2$, the glass develops color or the oxidation effect ends up promoting deterioration of the molding surface of the mold. Accordingly, the content of Sn added, as converted to $SnO_2$, is desirably 0 to 1 mass %, preferably 0 to 0.5 mass %, as the above ratio.

Additionally, Ce oxides, sulfates, nitrates, chlorides, and fluorides can be added in small quantities as clarifying agents.

In optical glass I, it is possible to maintain glass stability while achieving the optical characteristics of a high refractive index and low dispersion. Thus, it is possible not to incorporate components such as Lu, Hf, Ga, In, and Sc. Since Lu, Hf, Ga, In, and Sc are expensive components, the contents of each of $Lu^{3+}$, $Hf^{4+}$, $Ga^{3+}$, $In^{3+}$, and $Sc^{3+}$ are desirably kept to 0 to 1%, preferably to 0 to 0.5%. It is particularly desirable not to incorporate any $Lu^{3+}$, not to incorporate any $Hf^{4+}$, not to incorporate any $Ga^{3+}$, not to incorporate any $In^{3+}$, and not to incorporate any $Sc^{3+}$.

Further, taking into account the environmental impact, it is desirable to not incorporate As, Pb, U, Th, Te, or Cd.

To utilize the good light-transmitting properties of the glass, it is desirable not to incorporate substances that cause coloration, such as Cu, Cr, V, Fe, Ni, Co, Nd, and Tb.

Accordingly, optical glass I desirably comprises essentially none of the above Pb or the like. In this context, "comprises essentially none" means that none is actively incorporated as a glass component. However, the unintentional mixing in as an impurity is permissible.

Optical glass I is oxide glass. The principal anion component is $O^{2-}$. It is possible to add small quantities of $Cl^-$, $F^-$ as a clarifying agent as set forth above. However, to provide optical glass having a high refractive index and a low dispersion property with good glass stability, the content of $O^{2-}$ is desirably equal to or greater than 98 anion %, preferably equal to or greater than 99 anion %, more preferably equal to or greater than 99.5 anion %, and still more preferably, 100 anion %.

(Refractive Index nd and Abbé Number vd)

The refractive index nd of optical glass I ranges from 1.95 to 2.50. The lower limit of the refractive index nd is desirably equal to or higher than 1.96, preferably equal to or higher than 1.97, more preferably equal to or higher than 1.98, still more preferably equal to or higher than 1.99, yet more preferably equal to or higher than 2.00, and yet still, in order of increasing preference, equal to or higher than 2.02, equal to or higher than 2.03, equal to or higher than 2.04, and equal to or higher than 2.05. The upper limit of the refractive index nd is desirably equal to or lower than 2.40, preferably equal to or lower than 2.30, more preferably equal to or lower than 2.20, still more preferably equal to or lower than 2.15, yet more preferably equal to or lower than 2.10, and yet still more preferably, equal to or lower than 2.09. Raising the refractive index is effective for increasing the functionality and compactness of an optical system combining optical elements with the above optical element. Limiting the upper limit of the refractive index is advantageous for enhancing the glass stability.

The Abbé number vd of optical glass I ranges from 18 to 40. When utilizing a low dispersion property to provide an optical element material suited to chromatic aberration correction, a high Abbé number vd is advantageous. From this perspective, the lower limit of the Abbé number is desirably equal to or higher than 20, preferably equal to or higher than 21, more preferably equal to or higher than 22, still more preferably equal to or higher than 23, and yet more preferably, equal to or higher than 24.

Additionally, it is advantageous in terms of maintaining and enhancing the glass stability to relax the upper limit of the Abbé number vd. From this perspective, the upper limit of the Abbé number vd is desirably equal to or lower than 35, preferably equal to or lower than 30, more preferably equal to or lower than 29, still more preferably equal to or lower than 28, and yet more preferably, equal to or lower than 27.

From the perspectives of enhancing the functionality and compactness of an optical system combining optical elements with the above optical element, it is desirable for the refractive index nd and the Abbé number vd to be within the ranges set forth above while satisfying expression (3-1) below, preferably while satisfying expression (3-2) below, still more preferably satisfying expression (3-3) below, yet more preferably satisfying expression (3-4) below, yet still more preferably satisfying expression (3-5) below, and even more preferably, satisfying expression (3-6) below.

$$nd \geq 2.46-(0.02 \times vd) \quad (3\text{-}1)$$

$$nd \geq 2.48-(0.02 \times vd) \quad (3\text{-}2)$$

$$nd \geq 2.50-(0.02 \times vd) \quad (3\text{-}3)$$

$$nd \geq 2.52-(0.02 \times vd) \quad (3\text{-}4)$$

$$nd \geq 2.54-(0.02 \times vd) \quad (3\text{-}5)$$

$$nd \geq 2.55-(0.02 \times vd) \quad (3\text{-}6)$$

Optical glass with an even higher refractive index is suitable as a material for optical elements suited to enhancing the functionality and increasing the compactness of optical systems such as image pickup optical systems and projecting optical systems. Even when fabricating lenses with identical focal lengths, it is possible to reduce the absolute value of the curvature (soften the curve) of the optically functional surface of the lens. This is thus advantageous in terms of lens molding and processing. Additionally, further raising the refractive index of an optical lens diminishes the thermal stability of the lens and increases coloration, that is, tends to reduce the light transmittance in the visible short wavelength range. Accordingly, from the perspectives of applications and productivity, optical lens I can be roughly divided into, and separately used in, cases where achieving a higher refractive index is the priority and cases where enhancing thermal stability or reducing coloration is the priority.

(Liquidus Temperature)

High refractive index glass contains large amounts of refractive index components (such as $La^{3+}(La_2O_3)$, $Gd^{3+}(Gd_2O_3)$, $Y^{3+}(Y_2O_3)$, $Yb^{3+}(Yb_2O_3)$, $Ti^{4+}(TiO_2)$, $Nb^{5+}(Nb_2O_5)$, $Ta^{5+}(Ta_2O_5)$, $W^{6+}(WO_3)$, and $Zr^{4+}(ZrO_2)$). However, each one of these components has an extremely high melting point by itself. When the total content of high refractive index components is large, the total content of components that serve to lower the melting temperature, such as alkali metal components and alkaline earth metal components, will be relatively small and meltability and resistance to devitrification will be low. Thus, the melting temperature is raised to obtain homogeneous glass.

When the melting temperature is raised, the corrosiveness of the glass melt intensifies, the melt vessel is corroded, and materials constituting the vessel such as platinum and platinum alloys leach out into the glass melt, coloring the glass or becoming platinum foreign matter. When the melting temperature is high, volatile components such as $B^{3+}$ volatize, the glass composition changes over time, and there are problems such as variation in the optical characteristics.

To solve such problems, it suffices to inhibit the rise in the melting temperature. The range of the melting temperature can be thought of as the temperature range over which homogeneous glass melt can be obtained. The lower limit of the temperature range can be thought of as changing more or less in conjunction with the rise and fall of the liquidus temperature. Accordingly, inhibiting a rise in the liquidus temperature can inhibit a rise in the melting temperature.

When it is possible to inhibit a rise in the liquidus temperature, devitrification during glass molding will be effectively prevented and the viscosity of the glass can be adjusted to within a range suited to molding, facilitating the fabrication of a high-quality molded glass article.

As set forth above, both increases in the refractive index and rises and falls in the liquidus temperature are linked to changes in the quantities of high refractive index components. Thus, the evaluation of meltability and resistance to devitrification is suitably conducted using indicators taking into account the refractive index and the liquidus temperature. In optical glass I, denoting the liquidus temperature as LT [° C.], the above indicator is defined as $LT/(nd-1)$ for glass of refractive index nd. The denominator is a value obtained by subtracting the refractive index 1 in a vacuum from the refractive index of the glass. The lower $LT/(nd-1)$ is, the better the meltability and resistance to devitrification of the glass as a high refractive index glass that are indicated.

In a desirable embodiment of optical glass I, a good balance is established between the quantities of the various components by inhibiting a rise in the liquidus temperature while maintaining desired optical characteristics. Thus, expression (1) below can be satisfied.

$$LT/(nd-1) \leq 1250° C. \quad (1)$$

To obtain glass with further improved meltability and resistance to devitrification, optical glass satisfying expression (1-A) below is desirable, optical glass satisfying expression (1-B) below is preferred, optical glass satisfying expression (1-C) below is of greater preference, optical glass satisfying expression (1-D) below is of still greater preference, optical glass satisfying expression (1-E) below is of yet greater preference, and optical glass satisfying expression (1-F) below is of yet still greater preference.

$$LT/(nd-1) \leq 1230° C. \quad (1\text{-A})$$

$$LT/(nd-1) \leq 1220° C. \quad (1\text{-B})$$

$$LT/(nd-1) \leq 1210° C. \quad (1\text{-C})$$

$$LT/(nd-1) \leq 1205° C. \quad (1\text{-D})$$

$$LT/(nd-1) \leq 1200° C. \quad (1\text{-E})$$

$$LT/(nd-1) \leq 1190° C. \quad (1\text{-F})$$

As $LT/(nd-1)$ is reduced, maintaining desired optical characteristics tends to become more difficult. It is thus desirable not to excessively reduce $LT/(nd-1)$. From this perspective, optical glass satisfying expression (1-G) is desirable, optical glass satisfying expression (1-H) is preferred, optical glass satisfying expression (1-I) is of greater preference, optical glass satisfying expression (1-J) is of still greater preference, optical glass satisfying expression (1-K) is of yet greater preference, and optical glass satisfying expression (1-L) is of yet still greater preference.

$$LT/(nd-1) \geq 1050° C. \quad (1\text{-G})$$

$$LT/(nd-1) \geq 1070° C. \quad (1\text{-H})$$

$$LT/(nd-1) \geq 1080° C. \quad (1\text{-I})$$

$$LT/(nd-1) \geq 1090° C. \quad (1\text{-J})$$

$$LT/(nd-1) \geq 1110° C. \quad (1\text{-K})$$

$$LT/(nd-1) \geq 1120° C. \quad (1\text{-L})$$

(Partial Dispersion Characteristic)

Optical glass I is desirably glass with a low partial dispersion ratio when the Abbé number vd has been fixed. Optical elements such as lenses comprised of such optical glass are suitable for high-order chromatic aberration correction.

In this context, the partial dispersion ratio Pg,F is denoted as $(ng-nF)/(nF-nc)$ using the various refractive indexes ng, nF, and nc at the g line, F line, and c line.

To provide optical glass suited to high-order chromatic aberration correction, in optical glass I, the partial dispersion ratio Pg,F and the Abbé number vd desirably satisfy the relation denoted by expression (4-1) below, preferably satisfy the relation denoted by expression (4-2) below, and more preferably satisfy the relation denoted by expression (4-3) below.

$$Pg,F \leq -0.005 \times vd + 0.750 \quad (4\text{-1})$$

$$Pg,F \leq -0.005 \times vd + 0.745 \quad (4\text{-2})$$

$$Pg,F \leq -0.005 \times vd + 0.743 \quad (4\text{-3})$$

In the partial dispersion ratio Pg, F-Abbé number vd plot, when the partial dispersion ratio above the normal line serving as the reference for a normal partial diffusion glass is denoted as Pg,F(0), Pg,F(0) is denoted by the following expression using the Abbé number vd.

$$Pg,F(0)=0.6483-(0.0018 \times vd)$$

ΔPg,F is the deviation in partial dispersion ratio Pg,F from the normal line and is denoted by the following expression.

$$\Delta Pg,F = Pg,F - Pg,F(0) = Pg,F + (0.0018 \times vd) - 0.6483$$

In a desirable embodiment of the optical glass of the above aspect, deviation ΔPg,F is equal to or less than 0.030, providing an optical element material that is suitable for high-order chromatic aberration correction. A preferred range for ΔPg,F is equal to or less than 0.025. A range of greater preference is equal to or less than 0.020. A range of still greater preference is equal to or less than 0.015. A range of yet greater preference is equal to or less than 0.001. The lower limit of deviation ΔPg,F is preferably equal to or greater than −0.001, preferably equal to or greater than 0.000, more preferably equal to or greater than 0.003.

(Specific Gravity)

The optical glass of the above aspect is high refractive index glass. Generally, when glass is imparted with a high refractive index, the specific gravity tends to increase. However, an increase in specific gravity is undesirable in that it invites an increase in the weight of optical elements. By contrast, the optical glass of the aspect set forth above has the above glass composition and thus can have a specific gravity of equal to or less than 5.50 while being high refractive index glass. The upper limit of the specific gravity is desirably 5.40, preferably 5.30, and more preferably, 5.20. However, when the specific gravity is excessively reduced, the stability of the glass diminishes and the liquidus temperature tends to rise. Thus, the specific gravity is desirably equal to or higher than 4.50. The lower limit of the specific gravity is desirably 4.60, preferably 4.70, more preferably 4.80, and still more preferably, 4.90.

(Transmittance Characteristics)

The light-transmitting properties of optical glass I will be described next.

Optical glass I can exhibit high light transmittance over a broad wavelength range in the visible region. In a desirable embodiment of optical glass I, λ70 exhibits a degree of coloration at equal to or lower than 680 nm. The preferred range of λ70 is equal to or lower than 660 nm. The range of greater preference of λ70 is equal to or lower than 650 nm. The range of still greater preference of λ70 is equal to or lower than 600 nm. The range of yet greater preference of λ70 is equal to or lower than 560 nm. The range of yet still greater preference of λ70 is equal to or lower than 530 nm. The lower limit of λ70 is not specifically limited. However, 380 nm can be considered a yardstick for the lower limit of 270.

In this context, the term λ70 is the wavelength at which the light transmittance over the wavelength range of 280 to 700 nm is 70%. The term light transmittance is the spectral transmittance obtained by directing light from a direction perpendicular to the surface that has been polished on a glass sample having mutually parallel surfaces that have been polished to a thickness of 10.0±0.1 mm, that is, Iout/Iin where the intensity of the light entering the sample is denoted as Iin and the intensity of the light passing through the material is denoted as Iout. The spectral transmittance includes the loss by reflection of light on the surface of the sample. The polishing refers to smoothing to an adequately fine state of surface roughness for the wavelengths of the wavelength region being measured. In optical glass I, in the visible range on the long wavelength side of λ70, the optical transmittance desirably exceeds 70%.

λ5 is the wavelength at which the light transmittance as measured by the method used for λ70 becomes 5%. The range of λ5 is desirably equal to or lower than 450 nm, preferably equal to or lower than 430 nm, more preferably equal to or lower than 410 nm, still more preferably equal to or lower than 400 nm, yet more preferably equal to or lower than 395 nm, and yet still more preferably, equal to or lower than 390 nm. The lower limit of λ5 is not specifically limited. However, 300 nm can be considered a yardstick for the lower limit of λ5.

The above spectral transmittance can be measured for the wavelength range of 280 to 700 nm as set forth above. Normally, as the wavelength increases in length from λ5, the light transmittance increases, and once λ70 has been reached, a high transmittance of equal to or greater than 70% is maintained to a wavelength of 700 nm.

(Glass Transition Temperature)

Optical glass I is suited to forming a smooth optically functional surface by polishing. The suitability to cold processing such as polishing, that is, the cold processing property, is indirectly related to the glass transition temperature. Glasses with a low glass transition temperature are better suited to precision press molding than to cold processing. In contrast, glasses with a high glass transition temperature are better suited to cold processing than to precision press molding, and have a good cold processing property. Accordingly, in optical glass I as well, it is desirable not to excessively lower the glass transition temperature: equal to or higher than 650° C. is desirable, equal to or higher than 670° C. is preferred, equal to or higher than 680° C. is of greater preference, equal to or higher than 690° C. is of still greater preference, equal to or higher than 700° C. is of yet greater preference, equal to or higher than 710° C. is of yet still greater preference, and equal to or higher than 720° C. is of even greater preference.

However, an excessively high glass transition temperature causes the heating temperature to rise in the course of reheating and softening the glass for molding. The metal mold used in molding deteriorates markedly, the annealing temperature rises, and the annealing furnace undergoes marked deterioration and wear and tear. Accordingly, the glass transition temperature is desirably equal to or lower than 850° C., preferably equal to or lower than 800° C., more preferably equal to or lower than 780° C., still more preferably equal to or lower than 760° C., yet more preferably equal to or lower than 750° C., and yet still more preferably, equal to or lower than 740° C.

[Optical Glass II]

Optical glass II, another aspect of the optical glass of the present invention, will be described next.

In optical glass II, the refractive index nd ranges from 1.95 to 2.50, the Abbé number vd ranges from 18 to 40, and the relation between the liquidus temperature LT and the refractive index nd satisfies expression (1) above.

In optical glass II, it is possible to inhibit the deterioration of the meltability and resistance to devitrification that are peculiar to high refractive index, low dispersion glasses. Accordingly, optical glass II can yield optical glass of high homogeneity and little coloration while having a high refractive index.

Details relating to the refractive index nd, Abbé number vd, and the relation between the liquidus temperature LT and refractive index nd are identical to those for optical glass I.

A desirable embodiment of optical glass II (referred to as "optical glass II-A", hereinafter) is oxide glass comprising essential components in the form of $B^{3+}$, $Si^{4+}$, and $La^{3+}$, and at least one selected from among $Gd^{3+}$, $Y^{3+}$, $Yb^{3+}$, $Ti^{4+}$, $Nb^{5+}$, $Ta^{5+}$, $W^{6+}$, and $Zr^{4+}$. The content of each of $B^{3+}$, $Si^{4+}$, and $La^{3+}$ desirably falls within the same ranges as in optical glass I.

Optical glass II-A makes it possible to maintain glass stability while achieving optical characteristics of a high refractive index and low dispersion. Thus, components such as Lu, Hf, Ga, In, and Sc need not be incorporated. Since Lu, Hf, Ga, In, and Sc are expensive components, the content of $Lu^{3+}$, $Hf^{4+}$, $Ga^{3+}$, $In^{3+}$, and $Sc^{3+}$ are desirably kept to 0 to 1% each, and preferably kept to 0 to 0.5% each. Not incorporating $Lu^{3+}$, not incorporating $Hf^{4+}$, not incorporating $Ga^{3+}$, not incorporating $In^{3+}$, and not incorporating $Sc^{3+}$ are particularly desirable.

Further, taking into account the environmental impact, it is desirable to not incorporate As, Pb, U, Th, Te, or Cd.

Further, to utilize the good light-transmitting property of the glass, it is desirable to not incorporate substances that cause coloration, such as Cu, Cr, V, Fe, Ni, Co, Nd, and Tb.

Optical glass II-A is oxide glass in which the principal anion component is $O^{2-}$. Small amounts of $Cl^-$, $F^-$ can also be added as a clarifying agent. However, to provide optical glass having a high refractive index, low dispersion, and good glass stability, the $O^{2-}$ content is desirably kept to equal to or higher than 98 anion %, preferably to equal to or higher than 99 anion %, more preferably to equal to or higher than 99.5 anion %, and still more preferably, to 100 anion %.

In a desirable embodiment of optical glass II-A (referred to as "optical glass II-B", hereinafter), at least one from among $Gd^{3+}$, $Y^{3+}$, and $Yb^{3+}$ are incorporated as glass components. The desirable content ranges of each of $Gd^{3+}$, $Y^{3+}$, and $Yb^{3+}$ are as given for optical glass I.

In another desirable embodiment of optical glass II-A (referred to as "optical glass II-C", hereinafter), $Ti^{4+}$ and $Nb^{5+}$ are incorporated as glass components. The desirable content ranges of each of $Ti^{4+}$ and $Nb^{5+}$ are as given for optical glass I.

To achieve the object of the present invention, optical glass (referred to as "optical glass II-D", hereinafter) that is both optical glass II-B and optical glass II-C, is desirable. The composition range and characteristics of optical glass II-D are as given for optical glass I.

[Optical Glass III]

Another aspect of the optical glass of the present invention, that is, optical glass III, will be described next.

Optical glass III is oxide glass with a refractive index nd ranging from 1.95 to 2.50 and an Abbé number vd ranging from 18 to 40. It contains essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$. It contains, denoted as cation %, 1 to 30% of $Si^{4+}$; 1 to 50% of $B^{3+}$ (where the total of $Si^{4+}$ and $B^{3+}$ is 5 to 55%); a total of 11 to 70% of $La^{3+}$, $Gd^{3+}$, $Y^{3+}$, and $Yb^{3+}$ (where $La^{3+}$ is 10 to 50%); and a total of 23 to 70% of $Ti^{4+}$, $Nb^{5+}$, $Ta^{5+}$, and $W^{6+}$ (with equal to or greater than 1% of $Nb^{5+}$ and greater than 22% of $Ti^{4+}$); wherein the cation ratio of the content of $Y^{3+}$ to the total content of $Gd^{3+}$, $Y^{3+}$, and $Yb^{3+}$ [$Y^{3+}/(Gd^{3+}+Y^{3+}+Yb^{3+})$] is equal to or less than 0.60.

In optical glass III, to raise the refractive index while maintaining glass stability, it is desirable to make either one, or both, of the compositional adjustments of keeping the cation ratio of the $W^{6+}$ content to the total content of $Ti^{4+}$, $Nb^{5+}$, $Ta^{5+}$, and $W^{6+}$ [$W^{6+}/(Ti^{4+}+Nb^{5+}+Ta^{5+}+W^{6+})$] to less than 0.10 and keeping the cation ratio of the $Ti^{4+}$ content to the $B^{3+}$ content ($Ti^{4+}/B^{3+}$) to equal to or greater than 0.85. For details relating to the preferred ranges of the above cation ratios, reference can be made to the description of optical glass I.

In the description of optical glasses I, II, and III set forth above, unless specifically stated otherwise, the description of one optical glass can be applied to the description of the other optical glasses.

[Method of Manufacturing Optical Glass]

The method of manufacturing optical glass according to an aspect of the present invention will be described next.

The method of manufacturing optical glass of an aspect of the present invention, in a method of manufacturing optical glass comprising heating and melting glass starting materials and molding the glass melt obtained, further comprises blending the above glass starting materials to obtain the optical glass of the present invention and conducting the melting in a glass melting vessel made of platinum or a platinum alloy.

For example, powder-form compound starting materials or cullet starting materials are weighed out and blending in a manner corresponding to the targeted glass composition, fed into a melting vessel made of platinum or a platinum alloy, and then melted by heating. Once the starting materials have been thoroughly melted and vitrified, the temperature of the glass melt is raised to conduct clarification. The clarified glass melt is stirred in a stirrer to render it homogeneous, continuously fed to, and caused to flow out of, a glass outflow pipe, rapidly cooled, and solidified to obtain a molded glass article.

Keeping the melting temperature of the optical glass to within a range of 1,250 to 1,500° C. is desirable to obtain homogeneous glass with little coloration and with various stable characteristics such as optical characteristics.

[Press-Molding Glass Gob]

The press-molding glass gob according to an aspect of the present invention is comprised of the optical glass of the aspect set forth above. The shape of the gob is one that readily permits press molding based on the shape of the press-molded article being targeted. The weight of the gob is also set in conformity with the press-molded article. Since highly stable glass can be employed according to an aspect of the present invention, the glass tends not to devitrify even when reheated and melted for press molding, making it possible to stably produce a high-quality molded article.

Examples of manufacturing press-molding glass gobs will be set forth below.

In the first manufacturing example, a glass melt flowing out of a pipe into casting molds disposed horizontally beneath the outflow pipe is continuously cast and formed into plates of a certain thickness. The molded glass is continuously drawn out in a horizontal direction from an opening provided in a lateral surface of the casting mold. The molded articles of plate-like glass are drawn out by means of a conveyor belt. By keeping the drawing rate of the conveyor belt constant and conducting drawing out so that the thickness of the molded glass articles remains constant, it is possible to obtain molded glass articles of prescribed thickness and plate width. The molded glass article is conveyed into an annealing furnace by the conveyor belt and gradually cooled. The gradually cooled molded glass article is cut or cleaved in the direction of plate thickness, and subjected to a polishing process or barrel polishing to obtain a press-molding glass gob.

In the second manufacturing example, the glass melt is cast into a cylindrical casting mold instead of the above casting mold and molded into a cylindrical molded glass article. The molded glass article that has been molded in the casting mold is drawn out perpendicularly downward at a constant rate from an opening in the bottom of the casting mold. The withdrawing rate can be established so that the level of glass melt liquid in the casting mold remains constant. After gradually cooling the molded glass article, it is cut or cleaved and subjected to a polishing process or barrel polishing to obtain a press-molding glass gob.

In the third manufacturing example, a molding device is provided in the form of multiple forming molds disposed at equal intervals along the circular perimeter of a round turntable beneath the outflow pipe, the turntable is index rotated, and one of the positions at which the molds are retained is adopted as a position to which the glass melt is fed to the molds (referred to as the "casting position"). The glass melt is fed, the glass melt that has been fed is molded into a molded glass article, and the molded glass article is removed at a prescribed stopping position (takeout position) of the mold that differs from the casting position. What stopping position to make the takeout position can be determined taking into account the rotational speed of the turntable, the cooling rate of the glass, and the like. The feeding of glass melt to the mold at the casting position can be conducted by the method of dripping the glass melt out through a glass outflow opening of the outflow pipe and receiving the glass droplets on the casting molds; by the method of causing the casting mold that stops at the casting position to approach the glass outflow opening and support the lower end portion of the glass melt flow that is flowing out, creating a constriction part way along the glass flow, and quickly lowering in a vertical direction the mold at a prescribed timing to separate the glass melt below the constriction and receive it in the mold; by the method of cutting the glass melt flow that is flowing out with a cutting blade and receiving the separated glass melt gob in a mold that has stopped at the casting position; and the like.

It suffices to use a known method to mold the glass on the mold. Among such methods, gas can be blown upward from the mold to apply upward air pressure to the glass gob, the glass gob can be molded while being floated, and the generation of wrinkles in the surface of the molded glass article and cracking of the molded glass article due to contact with the mold can be prevented.

By selecting the shape of the pressing mold and how the above gas is blown, the shape of the molded glass article can be rendered spherical, spheroidal, a shape having one rotational axis of symmetry, a shape such that two surfaces facing in the axial direction of the rotational axis of symmetry are both outwardly convex, or the like. These shapes are suitable to glass gobs for the press molding of optical elements such as lenses or optical element blanks. The molded glass article thus obtained can be used as is or the surface thereof can be polished or barrel polished to obtain a press-molding glass gob.

[Optical Element Blank and Method of Manufacturing the Same]

The optical element blank according to an aspect of the present invention, and the method of manufacturing the same, will be described next.

The optical element blank according to an aspect of the present invention is comprised of the optical glass of the above aspect. The optical element blank according to an aspect of the present invention is suitable as a glass base material for preparing an optical element having various properties provided by the optical glass of the above aspect.

The optical element blank is a molded glass article having a shape approximating the shape of the optical element to which a processing allowance for removal by grinding or polishing has been added.

In the first embodiment of the method of manufacturing an optical element blank according to an aspect of the present invention, in the method of manufacturing an optical element blank that is to be finished into an optical element by grinding and polishing, the press-molding glass gob of the aspect set forth above is softened by heating and press molded. This method is called the reheating press-molding method.

In the second embodiment of the method of manufacturing an optical element blank according to an aspect of the present invention, in the method of manufacturing an optical element blank that is to be finished into an optical element by grinding and polishing, the glass starting materials are melted by heating and the glass melt obtained is press molded to prepare the optical element blank of the aspect set forth above. This method is called the direct press-molding method.

In the above first embodiment, a pressing mold having a molding surface of a shape approximating the reverse shape of the surface of the targeted optical element is prepared. The pressing mold is comprised of mold parts including an upper mold, a lower mold, and as needed, a barrel mold.

Next, the press-molding glass gob is softened by heating, introduced into a preheated lower mold, pressed by an upper mold facing the lower mold, and molded into an optical element blank. To prevent fusion of the glass and the mold during press molding, the surface of the press-molding glass gob can be uniformly coated in advance with a mold separating agent in powder form, such as boron nitride.

Next, the molds are separated, and the optical element blank is removed from the pressing mold and annealed. This annealing process reduces distortion within the glass and achieves optical characteristics such as the refractive index that are of the desired values.

Known items can be applied for the conditions under which the glass gob is added, the press-molding conditions, the materials employed in the pressing mold, and the like. The above processing can be conducted in air.

In the second embodiment, the pressing mold is comprised of mold parts including an upper mold, a lower mold, and as needed, a barrel mold. The molding surfaces of the pressing mold are processed into a shape that is the reverse of the surface shape of the optical element blank, as set forth above.

A powder mold release agent such as boron nitride is suitably and uniformly coated on the molding surface of the lower mold, and a glass melt that has been melted in conformity with the method of manufacturing optical glass set forth above is caused to flow out onto the molding surface of the lower mold. When a desired quantity of glass melt has accumulated on the lower mold, the flow of glass melt is cut with a cutting blade called a shear. After obtaining a glass melt gob on the lower mold in this manner, the lower mold is displaced for each glass melt gob to a position where the upper mold is standing by above. The glass is pressed by the upper mold and the lower mold to mold an optical element blank.

The mold is then separated, the optical element blank is removed from the pressing mold, and an annealing process is conducted. This annealing process reduces distortion within the glass and achieves optical characteristics such as the refractive index that are of the desired values.

Known items can be applied for the conditions under which the glass gob is added, the press-molding conditions, the materials employed in the pressing mold, and the like. The above processing can be conducted in air.

[Optical Element and the Method for Manufacturing the Same]

The optical element according to an aspect of the present invention will be described next.

The optical element according to an aspect of the present invention is comprised of optical glass of the aspect set forth above. The optical element according to an aspect of the present invention has various properties that are imparted by the optical glass of the aspect set forth above, and is thus effective for enhancing the functionality and compactness of an optical system. Various lenses and prisms can be given by way of example for the optical element of the present invention. Examples of lenses are various lenses such as concave meniscus lenses, convex meniscus lenses, biconvex lenses, biconcave lenses, planoconvex lenses, and planoconcave lenses with lens surfaces that are spherical or aspherical.

These lenses can be combined with lenses made of low dispersion glass to correct for chromatic aberration, and are suitable as lenses for chromatic aberration correction.

Since prisms have high refractive indexes, they can be combined in image pickup optical systems, and the optical path can be bent to face in a desired direction and achieve a compact optical system with a wide viewing angle.

On the optically functional surface of the optical element according to an aspect of the present invention, films that control light transmittance such as antireflective films can be provided.

The method of manufacturing an optical element according to an aspect of the present invention will be described next.

The method of manufacturing an optical element according to an aspect of the present invention is characterized by processing an optical element blank that has been prepared by the method of the aspect set forth above. In an embodiment of the present invention, optical glass with good workability can be employed as the optical glass constituting the optical element blank. Thus, a known method can be applied as the processing method.

EXAMPLES

The present invention is further described below through Examples. However, the present invention is not limited to the embodiments given in Examples. By referencing Examples set forth below and applying the methods of adjusting the contents of the various glass components set forth above, it is possible to obtain optical glasses according to the various aspects of the present invention.

(Preparation Example of Optical Glass)

First, employing starting materials in the form of nitrates, sulfates, hydroxides, oxides, boric acid, and the like so as to obtain each of oxide glass Nos. 1 to 57 having the compositions (denoted as cation %) indicated in Table 1, the various starting material powders were weighed out and thoroughly mixed to obtain a blended starting material. The blended starting material was charged to a crucible made of platinum or a crucible made of a platinum alloy, heated to 1,400° C., melted, clarified, and stirred to obtain a homogeneous glass melt.

The glass melt was caused to flow into a preheated casting mold, rapidly cooled, and maintained for 2 hours at a temperature in the vicinity of the glass transition temperature. Subsequently, it was gradually cooled to obtain the optical glasses of each of oxide glasses Nos. 1 to 57. No crystal precipitation or mixing in of foreign matter such as platinum inclusion was observed in the glasses of Nos. 1 to 52.

The entire quantity of anion components of oxide glasses Nos. 1 to 57 was $O^{2-}$.

Measurement of Glass Characteristics

The characteristics of each glass were measured by the following methods. The measurement results are given in Tables 1 and 2.

(1) Refractive Index nd and Abbé Number vd

Optical glass that had been cooled at a rate of 30° C. per hour was measured.

(2) Partial Dispersion Ratio Pg,F, and Difference ΔPg,F from the Normal Line of the Partial Dispersion Ratio The refractive indexes ng, nF, and nc were measured for the optical glasses that had been cooled at a rate of 30° C. per hour and the partial dispersion ratio Pg,F was calculated from these values.

The difference ΔPg,F from the normal line of the partial dispersion ratio was calculated from the partial dispersion ratio Pg,F(0) on the normal line calculated from the partial dispersion ratio Pg,F and the Abbé number vd.

(3) Glass Transition Temperature Tg

A differential scanning calorimeter (DSC) was used for measurement under conditions of a rise in temperature of 10° C./minute.

(4) Liquidus Temperature

The glass was charged to a furnace that had been heated to a prescribed temperature and maintained there for 2 hours. It was then cooled, the interior of the glass was observed at 100-fold magnification with an optical microscope, and the liquidus temperature was determined from the presence or absence of crystals.

(5) Specific Gravity

This was measured by Archimedes' method.

(6) λ70, λ5

With a glass sample having mutually parallel surfaces that had been polished to a thickness of 10.0±0.1 mm, using a spectrophotometer, light of intensity Iin was directed from a perpendicular direction onto the polished surface and the intensity Iout of the light passing through the sample was measured. The light transmittance Iout/Iin was calculated. The wavelength at which the light transmittance reached 70% was adopted as λ70, and the wavelength at which the light transmittance became 5% was adopted as λ5.

Measurement of the Number Density of Crystals Precipitating During Glass Manufacturing Glass is obtained by molding a glass melt. When the stability of the glass decreases, the number of crystal grains contained in the glass obtained increases when the glass melt is caused to flow into a casting mold and molded.

Accordingly, the stability of the glass, particularly the resistance to devitrification when molding a glass melt, can be evaluated based on the quantity of crystals contained in glass that has been melted and molded under constant conditions. An example of an evaluation method is given below.

Employing starting materials in the form of nitrates, sulfates, hydroxides, oxides, boric acid, and the like, various starting material powders were weighed out and thoroughly mixed to obtain a blended starting material. The blended starting material was charged to a 300 mL crucible made of platinum, heating to 1,400° C. for two hours, melted, and clarified to prepare 200 g of a homogeneous glass melt. During this period, the glass melt was stirred and shaken multiple times.

When two hours had elapsed, the crucible containing the glass melt was removed from the 1,400° C. furnace, and stirred and shaken for 15 to 20 seconds. The glass melt was then caused to flow into a casting mold made of carbon (60 mm×40 mm×10 mm to 15 mm) and placed within a gradually cooling furnace to remove distortion.

The interior of the glass obtained was observed with an optical microscope (at 100-fold magnification), the number of crystals that had precipitated was counted, and the number of crystals contained per kilogram of glass was calculated as the crystal number density (crystals/kg).

The crystal number densities of glass Nos. 1 to 52 that were evaluated by the above method were all 0 crystals/kg.

The values of the crystal number densities of glass Nos. 53 to 57 that were evaluated by the above method are given in Table 2.

A crystal number density as calculated by the evaluation method set forth above of less than 1,000 crystals/kg, preferably less than 500 crystals/kg, more preferably less than 300 crystals/kg, still more preferably less than 200 crystals/kg, yet more preferably less than 100 crystals/kg, even more preferably less than 50 crystals/kg, even still more preferably less than 20 crystals/kg, and even yet more preferably less than 0 crystals/kg was considered to be an indicator of a homogeneous optical glass with good glass stability.

For example, a comparison of glass Nos. 1 to 52 with Nos. 53 to 57, and a comparison between glass Nos. 53 to 57, revealed that the crystal number density as calculated by the evaluation method set forth above could be controlled by adjusting, for example, either one or both of the cation ratio $[W^{6+}/(Ti^{4+}+Nb^{5+}+Ta^{5+}+W^{6+})]$ and the cation ratio $(Ti^{4+}/B^{3+})$.

TABLE 1

| | No. 1 Cation % | No. 2 Cation % | No. 3 Cation % | No. 4 Cation % | No. 5 Cation % | No. 6 Cation % |
|---|---|---|---|---|---|---|
| $Si^{4+}$ | 10.27 | 10.48 | 10.27 | 8.48 | 10.48 | 9.48 |
| $B^{3+}$ | 12.51 | 17.76 | 12.51 | 19.76 | 17.76 | 17.76 |
| $La^{3+}$ | 25.29 | 30.80 | 27.29 | 30.80 | 30.30 | 30.80 |
| $Gd^{3+}$ | 4.17 | 4.25 | 4.17 | 4.25 | 4.25 | 4.25 |
| $Y^{3+}$ | 0.49 | 0.50 | 0.49 | 0.50 | 0.00 | 0.50 |
| $Yb^{3+}$ | 0.00 | 0.00 | 0.00 | 0.00 | 0.00 | 0.00 |
| $Ti^{4+}$ | 33.88 | 23.58 | 31.88 | 23.58 | 23.58 | 23.58 |
| $Nb^{5+}$ | 5.95 | 6.07 | 5.95 | 6.07 | 6.07 | 6.07 |
| $Ta^{5+}$ | 0.00 | 0.00 | 0.00 | 0.00 | 0.00 | 0.00 |
| $W^{6+}$ | 0.00 | 0.00 | 0.00 | 0.00 | 0.00 | 0.00 |
| $Zr^{4+}$ | 5.72 | 4.81 | 5.72 | 4.81 | 5.81 | 5.81 |
| $Zn^{2+}$ | 1.72 | 1.75 | 1.72 | 1.75 | 1.75 | 1.75 |
| $Li^+$ | 0.00 | 0.00 | 0.00 | 0.00 | 0.00 | 0.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ga^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 22.78 | 28.24 | 22.78 | 28.24 | 28.24 | 27.24 |
| $La^{3+} + Gd^{3+} + Y^{3+} + Yb^{3+}$ | 29.95 | 35.55 | 31.95 | 35.55 | 34.55 | 35.55 |
| $Ti^{4+} + Nb^{5+} + Ta^{5+} + W^{6+}$ | 39.83 | 29.65 | 37.83 | 29.65 | 29.65 | 29.65 |
| $Y^{3+}/(Gd^{3+} + Y^{3+} + Yb^{3+})$ | 0.11 | 0.11 | 0.11 | 0.11 | 0.00 | 0.11 |
| $Gd^{3+} + Y^{3+} + Yb^{3+}$ | 4.66 | 4.75 | 4.66 | 4.75 | 4.25 | 4.75 |
| $Zn^{2+}/(Ti^{4+} + Nb^{5+} Ta^{5+} + W^{6+})$ | 0.04 | 0.06 | 0.05 | 0.06 | 0.06 | 0.06 |
| $Li^+ + Na^+ + K^+$ | 0.00 | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 |
| $Ti^{4+}/B^{3+}$ | 2.71 | 1.33 | 2.55 | 1.19 | 1.33 | 1.33 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.110 | 2.047 | 2.102 | 2.051 | 2.049 | 2.054 |
| νd | 22.8 | 26.4 | 23.5 | 26.3 | 26.3 | 26.3 |
| $P_{g,F}$ | 0.623 | 0.608 | 0.618 | 0.607 | 0.608 | 0.604 |
| $\Delta P_{g,F}$ | 0.015 | 0.008 | 0.012 | 0.007 | 0.006 | 0.003 |
| Liquidus temperature LT (° C.) | 1240 | 1260 | 1280 | 1260 | 1260 | 1260 |
| Liquidus temperature LT/(nd − 1) (° C.) | 1117 | 1203 | 1162 | 1199 | 1201 | 1195 |
| Glass transition temperature (° C.) | 741 | 745 | 750 | 738 | 740 | 740 |
| Specific gravity | 5.02 | 5.16 | 5.09 | 5.17 | 5.14 | 5.19 |
| λ70 (nm) | | 476 | 583 | 475 | 481 | 475 |
| λ5 (nm) | | 375 | 388 | 375 | 375 | 375 |
| Number density of crystals precipitating (crystals/kg) | 0 | 0 | 0 | 0 | 0 | 0 |

| | No. 7 Cation % | No. 8 Cation % | No. 9 Cation % | No. 10 Cation % | No. 11 Cation % | No. 12 Cation % |
|---|---|---|---|---|---|---|
| $Si^{4+}$ | 9.50 | 9.23 | 8.96 | 8.72 | 9.50 | 9.50 |
| $B^{3+}$ | 18.82 | 18.25 | 17.74 | 17.25 | 18.81 | 18.82 |
| $La^{3+}$ | 29.37 | 28.52 | 27.71 | 26.94 | 26.75 | 24.12 |
| $Gd^{3+}$ | 4.26 | 4.14 | 4.02 | 3.91 | 3.88 | 3.50 |
| $Y^{3+}$ | 0.50 | 0.49 | 0.47 | 0.46 | 0.50 | 0.50 |
| $Yb^{3+}$ | 0.00 | 0.00 | 0.00 | 0.00 | 0.00 | 0.00 |
| $Ti^{4+}$ | 23.14 | 25.38 | 27.50 | 29.50 | 26.15 | 29.15 |
| $Nb^{5+}$ | 7.09 | 6.88 | 6.69 | 6.50 | 7.09 | 7.09 |
| $Ta^{5+}$ | 0.00 | 0.00 | 0.00 | 0.00 | 0.00 | 0.00 |

TABLE 1-continued

|  | | | | | | |
|---|---|---|---|---|---|---|
| $W^{6+}$ | 0.00 | 0.00 | 0.00 | 0.00 | 0.00 | 0.00 |
| $Zr^{4+}$ | 5.57 | 5.41 | 5.26 | 5.11 | 5.57 | 5.57 |
| $Zn^{2+}$ | 1.75 | 1.70 | 1.65 | 1.61 | 1.75 | 1.75 |
| $Li^+$ | 0.00 | 0.00 | 0.00 | 0.00 | 0.00 | 0.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 28.32 | 27.48 | 26.70 | 25.97 | 28.31 | 28.32 |
| $La^{3+} + Gd^{3+} + Y^{3+} + Yb^{3+}$ | 34.13 | 33.15 | 32.20 | 31.31 | 31.13 | 28.12 |
| $Ti^{4+} + Nb^{5+} + Ta^{5+} + W^{6+}$ | 30.23 | 32.26 | 34.19 | 36.00 | 33.24 | 36.24 |
| $Y^{3+}/(Gd^{3+} + Y^{3+} + Yb^{3+})$ | 0.11 | 0.11 | 0.10 | 0.11 | 0.11 | 0.13 |
| $Gd^{3+} + Y^{3+} + Yb^{3+}$ | 4.76 | 4.63 | 4.49 | 4.37 | 4.38 | 4.00 |
| $Zn^{2+}/(Ti^{4+} + Nb^{5+} + Ta^{5+} + W^{6+})$ | 0.06 | 0.05 | 0.05 | 0.04 | 0.05 | 0.05 |
| $Li^+ + Na^+ + K^+$ | 0.00 | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 |
| $Ti^{4+}/B^{3+}$ | 1.23 | 1.39 | 1.55 | 1.71 | 1.39 | 1.55 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.053 | 2.065 | 2.076 | 2.086 | 2.066 | 2.078 |
| νd | 26.0 | 25.3 | 24.6 | 24.0 | 24.8 | 23.6 |
| $P_{g,F}$ | 0.608 | 0.614 | 0.619 | 0.622 | 0.614 | 0.621 |
| $\Delta P_{g,F}$ | 0.006 | 0.011 | 0.015 | 0.017 | 0.010 | 0.015 |
| Liquidus temperature LT (° C.) | 1220 | 1230 | 1230 | 1260 | 1260 | 1270 |
| Liquidus temperature LT/(nd − 1) (° C.) | 1159 | 1155 | 1143 | 1160 | 1182 | 1178 |
| Glass transition temperature (° C.) | 735 | 733 | 731 | 730 | 726 | 706 |
| Specific gravity | 5.13 | 5.10 | 5.07 | 5.04 | 5.03 | 4.91 |
| λ70 (nm) | 488 | 526 | 543 | 646 | 649 | |
| λ5 (nm) | 376 | 381 | 385 | 390 | 382 | |
| Number density of crystals precipitating(crystals/kg) | 0 | 0 | 0 | 0 | 0 | 0 |

| | No. | | | | | |
|---|---|---|---|---|---|---|
| | 13 Cation % | 14 Cation % | 15 Cation % | 16 Cation % | 17 Cation % | 18 Cation % |
| $Si^{4+}$ | 9.80 | 9.23 | 9.23 | 13.72 | 10.67 | 9.23 |
| $B^{3+}$ | 19.38 | 18.25 | 18.25 | 12.03 | 18.06 | 18.25 |
| $La^{3+}$ | 30.28 | 28.52 | 28.52 | 24.32 | 31.35 | 28.52 |
| $Gd^{3+}$ | 4.39 | 4.14 | 4.14 | 4.01 | 4.33 | 4.14 |
| $Y^{3+}$ | 0.52 | 0.49 | 0.49 | 0.47 | 0.51 | 0.49 |
| $Yb^{3+}$ | 0.00 | 0.00 | 0.00 | 0.00 | 0.00 | 0.00 |
| $Ti^{4+}$ | 23.86 | 22.46 | 22.46 | 32.58 | 24.00 | 22.46 |
| $Nb^{5+}$ | 4.21 | 9.80 | 6.88 | 5.72 | 6.18 | 6.88 |
| $Ta^{5+}$ | 0.00 | 0.00 | 0.00 | 0.00 | 0.00 | 2.92 |
| $W^{6+}$ | 0.00 | 0.00 | 2.92 | 0.00 | 0.00 | 0.00 |
| $Zr^{4+}$ | 5.75 | 5.41 | 5.41 | 5.50 | 4.90 | 5.41 |
| $Zn^{2+}$ | 1.81 | 1.70 | 1.70 | 1.65 | 0.00 | 1.70 |
| $Li^+$ | 0.00 | 0.00 | 0.00 | 0.00 | 0.00 | 0.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 29.18 | 27.48 | 27.48 | 25.75 | 28.73 | 27.48 |
| $La^{3+} + Gd^{3+} + Y^{3+} + Yb^{3+}$ | 35.19 | 33.15 | 33.15 | 28.80 | 36.19 | 33.15 |
| $Ti^{4+} + Nb^{5+} + Ta^{5+} + W^{6+}$ | 28.07 | 32.26 | 32.26 | 38.30 | 30.18 | 32.26 |
| $Y^{3+}/(Gd^{3+} + Y^{3+} + Yb^{3+})$ | 0.11 | 0.11 | 0.11 | 0.10 | 0.11 | 0.11 |
| $Gd^{3+} + Y^{3+} + Yb^{3+}$ | 4.91 | 4.63 | 4.63 | 4.48 | 4.84 | 4.63 |
| $Zn^{2+}/(Ti^{4+} + Nb^{5+} + Ta^{5+} + W^{6+})$ | 0.06 | 0.05 | 0.05 | 0.04 | 0.00 | 0.05 |
| $Li^+ + Na^+ + K^+$ | 0.00 | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 | 0.00 |
| $Ti^{4+}/B^{3+}$ | 1.23 | 1.23 | 1.23 | 2.71 | 1.33 | 1.23 |
| $W^{6+}/(Ti^{4+} + Nb^{5+} + Ta^{5+} + W^{6+})$ | 0.00 | 0.00 | 0.09 | 0.00 | 0.00 | 0.00 |

TABLE 1-continued

| | | | | | | |
|---|---|---|---|---|---|---|
| nd | 2.042 | 2.063 | 2.060 | 2.096 | 2.048 | 2.059 |
| νd | 26.7 | 25.5 | 25.4 | 23.0 | 26.3 | 25.9 |
| $P_{g,F}$ | 0.608 | 0.613 | 0.613 | 0.624 | 0.608 | 0.612 |
| $\Delta P_{g,F}$ | 0.008 | 0.011 | 0.01 | 0.017 | 0.008 | 0.010 |
| Liquidus temperature LT (° C.) | 1250 | 1270 | 1260 | 1250 | 1260 | 1270 |
| Liquidus temperature LT/(nd − 1) (° C.) | 1200 | 1195 | 1189 | 1141 | 1202 | 1199 |
| Glass transition temperature (° C.) | 740 | 726 | 726 | 738 | 750 | 736 |
| Specific gravity | 5.14 | 5.13 | 5.23 | 4.96 | 5.14 | 5.26 |
| λ70 (nm) | 478 | 529 | 564 | 528 | 479 | 531 |
| λ5 (nm) | 374 | 379 | 380 | 404 | 374 | 377 |
| Number density of crystals precipitating(crystals/kg) | 0 | 0 | 0 | 0 | 0 | 0 |

| | No. | | | | | |
|---|---|---|---|---|---|---|
| | 19 Cation % | 20 Cation % | 21 Cation % | 22 Cation % | 23 Cation % | 24 Cation % |
| $Si^{4+}$ | 9.32 | 9.14 | 9.32 | 9.32 | 9.14 | 9.50 |
| $B^{3+}$ | 18.43 | 18.07 | 18.43 | 18.43 | 18.07 | 18.82 |
| $La^{3+}$ | 28.80 | 28.24 | 28.80 | 28.80 | 28.24 | 29.37 |
| $Gd^{3+}$ | 4.18 | 4.10 | 4.18 | 4.18 | 4.10 | 4.26 |
| $Y^{3+}$ | 0.49 | 0.48 | 0.49 | 0.49 | 0.48 | 0.50 |
| $Yb^{3+}$ | 0.00 | 0.00 | 0.00 | 0.00 | 0.00 | 0.00 |
| $Ti^{4+}$ | 22.68 | 22.25 | 22.68 | 22.68 | 22.25 | 23.14 |
| $Nb^{5+}$ | 6.95 | 6.81 | 6.95 | 6.95 | 6.81 | 4.08 |
| $Ta^{5+}$ | 0.00 | 0.00 | 0.00 | 0.00 | 0.00 | 3.01 |
| $W^{6+}$ | 0.00 | 0.00 | 0.00 | 0.00 | 0.00 | 0.00 |
| $Zr^{4+}$ | 5.46 | 5.36 | 5.46 | 5.46 | 5.36 | 5.57 |
| $Zn^{2+}$ | 1.72 | 1.69 | 1.72 | 1.72 | 1.69 | 1.75 |
| $Li^{+}$ | 1.97 | 3.86 | 0.00 | 0.00 | 0.00 | 0.00 |
| $Na^{+}$ | 0.00 | 0.00 | 1.97 | 0.00 | 0.00 | 0.00 |
| $K^{+}$ | 0.00 | 0.00 | 0.00 | 1.97 | 3.86 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 27.75 | 27.21 | 27.75 | 27.75 | 27.21 | 28.32 |
| $La^{3+} + Gd^{3+} + Y^{3+} + Yb^{3+}$ | 33.47 | 32.82 | 33.47 | 33.47 | 32.82 | 34.13 |
| $Ti^{4+} + Nb^{5+} + Ta^{5+} + W^{6+}$ | 29.63 | 29.06 | 29.63 | 29.63 | 29.06 | 30.23 |
| $Y^{3+}/(Gd^{3+} + Y^{3+} + Yb^{3+})$ | 0.10 | 0.10 | 0.10 | 0.10 | 0.10 | 0.11 |
| $Gd^{3+} + Y^{3+} + Yb^{3+}$ | 4.67 | 4.58 | 4.67 | 4.67 | 4.58 | 4.76 |
| $Zn^{2+}/(Ti^{4+} + Nb^{5+} + Ta^{5+} + W^{6+})$ | 0.06 | 0.06 | 0.06 | 0.06 | 0.06 | 0.06 |
| $Li^{+} + Na^{+} + K^{+}$ | 1.97 | 3.86 | 1.97 | 1.97 | 3.86 | 0.00 |
| $Mg^{2+} + Ca^{2+} + Sr^{2+} + Ba^{2+}$ | 0.00 | 0.00 | 0.00 | 0.00 | 0.00 | 0.00 |
| $Ti^{4+}/B^{3+}$ | 1.23 | 1.23 | 1.23 | 1.23 | 1.23 | 1.23 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.050 | 2.046 | 2.044 | 2.046 | 2.038 | 2.048 |
| νd | 26.2 | 26.3 | 26.2 | 26.2 | 26.3 | 26.5 |
| $P_{g,F}$ | 0.611 | 0.610 | 0.610 | 0.610 | 0.612 | 0.610 |
| $\Delta P_{g,F}$ | 0.010 | 0.009 | 0.009 | 0.009 | 0.011 | 0.010 |
| Liquidus temperature LT (° C.) | 1230 | 1250 | 1245 | 1250 | 1270 | 1270 |
| Liquidus temperature LT/(nd − 1) (° C.) | 1172 | 1195 | 1192 | 1195 | 1223 | 1211 |
| Glass transition temperature (° C.) | 710 | 702 | 728 | 737 | 737 | 741 |
| Specific gravity | 5.12 | 5.09 | 5.10 | 5.10 | 6.07 | 5.26 |
| λ70 (nm) | 478 | 483 | 512 | 482 | 488 | 482 |
| λ5 (nm) | 374 | 373 | 376 | 377 | 378 | 374 |
| Number density of crystals precipitating(crystals/kg) | 0 | 0 | 0 | 0 | 0 | 0 |

| | No. | | | | | |
|---|---|---|---|---|---|---|
| | 25 Cation % | 26 Cation % | 27 Cation % | 28 Cation % | 29 Cation % | 30 Cation % |
| $Si^{4+}$ | 9.50 | 9.41 | 9.23 | 9.23 | 9.90 | 9.14 |
| $B^{3+}$ | 18.82 | 18.61 | 18.25 | 21.17 | 19.60 | 18.07 |
| $La^{3+}$ | 29.37 | 29.08 | 28.52 | 28.52 | 26.42 | 32.10 |
| $Gd^{3+}$ | 4.26 | 4.22 | 4.14 | 4.14 | 4.44 | 4.10 |
| $Y^{3+}$ | 0.50 | 0.50 | 0.49 | 0.49 | 0.52 | 0.48 |
| $Yb^{3+}$ | 0.00 | 0.00 | 0.00 | 0.00 | 0.00 | 0.00 |
| $Ti^{4+}$ | 23.14 | 22.91 | 22.46 | 22.46 | 24.10 | 22.25 |

TABLE 1-continued

| | | | | | | |
|---|---|---|---|---|---|---|
| $Nb^{5+}$ | 1.07 | 7.02 | 6.88 | 6.88 | 7.38 | 6.81 |
| $Ta^{5+}$ | 6.02 | 0.00 | 0.00 | 0.00 | 0.00 | 0.00 |
| $W^{6+}$ | 0.00 | 0.00 | 0.00 | 0.00 | 0.00 | 0.00 |
| $Zr^{4+}$ | 5.57 | 5.52 | 5.41 | 5.41 | 5.81 | 5.36 |
| $Zn^{2+}$ | 1.75 | 1.74 | 1.70 | 1.70 | 1.83 | 1.69 |
| $Li^+$ | 0.00 | 0.00 | 0.00 | 0.00 | 0.00 | 0.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.99 | 2.92 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 28.32 | 28.02 | 27.48 | 30.40 | 29.50 | 27.21 |
| $La^{3+} + Gd^{3+} + Y^{3+} + Yb^{3+}$ | 34.13 | 33.80 | 33.15 | 33.15 | 31.38 | 36.68 |
| $Ti^{4+} + Nb^{5+} + Ta^{5+} + W^{6+}$ | 30.23 | 29.93 | 29.34 | 29.34 | 31.48 | 29.06 |
| $Y^{3+}/(Gd^{3+} + Y^{3+} + Yb^{3+})$ | 0.11 | 0.11 | 0.11 | 0.11 | 0.10 | 0.10 |
| $Gd^{3+} + Y^{3+} + Yb^{3+}$ | 4.76 | 4.72 | 4.63 | 4.63 | 4.96 | 4.58 |
| $Zn^{2+}/(Ti^{4+} + Nb^{5+} + Ta^{5+} + W^{6+})$ | 0.06 | 0.06 | 0.06 | 0.06 | 0.06 | 0.06 |
| $Li^+ + Na^+ + K^+$ | 0.00 | 0.00 | 0.00 | 0.06 | 0.06 | 0.06 |
| $Mg^{2+} + Ca^{2+} + Sr^{2+} + Ba^{2+}$ | 0.00 | 0.99 | 2.92 | 0.11 | 0.10 | 0.10 |
| $Ti^{4+}/B^{3+}$ | 1.23 | 1.23 | 1.23 | 1.06 | 1.23 | 1.23 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.043 | 2.048 | 2.039 | 2.043 | 2.054 | 2.051 |
| νd | 26.9 | 26.3 | 26.6 | 26.3 | 25.5 | 26.7 |
| $P_{g,F}$ | 0.609 | 0.609 | 0.606 | 0.611 | 0.615 | 0.607 |
| $\Delta P_{g,F}$ | 0.009 | 0.008 | 0.006 | 0.010 | 0.012 | 0.007 |
| Liquidus temperature LT (° C.) | 1300 | 1240 | 1270 | 1210 | 1230 | 1250 |
| Liquidus temperature LT/(nd − 1) (° C.) | 1246 | 1183 | 1223 | 1160 | 1167 | 1189 |
| Glass transition temperature (° C.) | 744 | 737 | 743 | 725 | 724 | 731 |
| Specific gravity | 5.39 | 5.14 | 5.15 | 5.08 | 5.04 | 5.21 |
| λ70 (nm) | 501 | 477 | 473 | 519 | 587 | 489 |
| λ5 (nm) | 373 | 375 | 372 | 376 | 381 | 372 |
| Number density of crystals precipitating(crystals/kg) | 0 | 0 | 0 | 0 | 0 | 0 |

| | No. | | | | | |
|---|---|---|---|---|---|---|
| | 31 Cation % | 32 Cation % | 33 Cation % | 34 Cation % | 35 Cation % | 36 Cation % |
| $Si^{4+}$ | 9.93 | 9.14 | 9.32 | 9.14 | 9.32 | 9.32 |
| $B^{3+}$ | 19.65 | 18.08 | 18.43 | 18.07 | 18.43 | 18.43 |
| $La^{3+}$ | 30.68 | 28.24 | 28.80 | 28.24 | 28.80 | 28.80 |
| $Gd^{3+}$ | 0.00 | 7.95 | 4.18 | 4.10 | 4.18 | 4.18 |
| $Y^{3+}$ | 0.52 | 0.48 | 0.49 | 0.48 | 0.49 | 0.49 |
| $Yb^{3+}$ | 0.00 | 0.00 | 0.00 | 0.00 | 0.00 | 0.00 |
| $Ti^{4+}$ | 24.17 | 22.25 | 22.68 | 22.25 | 22.68 | 22.68 |
| $Nb^{5+}$ | 7.40 | 6.81 | 6.95 | 6.81 | 6.95 | 6.95 |
| $Ta^{5+}$ | 0.00 | 0.00 | 0.00 | 0.00 | 0.00 | 0.00 |
| $W^{6+}$ | 0.00 | 0.00 | 0.00 | 0.00 | 0.00 | 0.00 |
| $Zr^{4+}$ | 5.82 | 5.36 | 5.46 | 5.36 | 5.46 | 5.46 |
| $Zn^{2+}$ | 1.83 | 1.69 | 1.72 | 1.69 | 1.72 | 1.72 |
| $Li^+$ | 0.00 | 0.00 | 0.00 | 0.00 | 0.00 | 0.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Mg^{2+}$ | 0.00 | 0.00 | 1.97 | 3.86 | 0.00 | 0.00 |
| $Ca^{2+}$ | 0.00 | 0.00 | 0.00 | 0.00 | 1.97 | 0.00 |
| $Sr^{2+}$ | 0.00 | 0.00 | 0.00 | 0.00 | 0.00 | 1.97 |
| $Ba^{2+}$ | 0.00 | 0.00 | 0.00 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 29.58 | 27.22 | 27.75 | 27.21 | 27.75 | 27.75 |
| $La^{3+} + Gd^{3+} + Y^{3+} + Yb^{3+}$ | 31.20 | 36.67 | 33.47 | 32.82 | 33.47 | 33.47 |
| $Ti^{4+} + Nb^{5+} + Ta^{5+} + W^{6+}$ | 31.57 | 29.06 | 29.63 | 29.06 | 29.63 | 29.63 |
| $Y^{3+}/(Gd^{3+} + Y^{3+} + Yb^{3+})$ | 1.00 | 0.06 | 0.10 | 0.10 | 0.10 | 0.10 |
| $Gd^{3+} + Y^{3+} + Yb^{3+}$ | 0.52 | 8.43 | 4.67 | 4.58 | 4.67 | 4.67 |
| $Zn^{2+}/(Ti^{4+} + Nb^{5+} + Ta^{5+} + W^{6+})$ | 0.06 | 0.06 | 0.06 | 0.06 | 0.06 | 0.06 |
| $Li^+ + Na^+ + K^+$ | 0.06 | 0.06 | 0.06 | 0.06 | 0.06 | 0.06 |
| $Mg^{2+} + Ca^{2+} + Sr^{2+} + Ba^{2+}$ | 1.00 | 0.06 | 0.10 | 0.10 | 0.10 | 0.10 |

TABLE 1-continued

|  | | | | | | |
|---|---|---|---|---|---|---|
| $Ti^{4+}/B^{3+}$ | 1.23 | 1.23 | 1.23 | 1.23 | 1.23 | 1.23 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.054 | 2.052 | 2.048 | 2.043 | 2.046 | 2.044 |
| νd | 25.4 | 26.7 | 26.3 | 26.5 | 26.3 | 26.4 |
| $P_{g,F}$ | 0.613 | 0.613 | 0.609 | 0.609 | 0.609 | 0.607 |
| $\Delta P_{g,F}$ | 0.010 | 0.013 | 0.007 | 0.008 | 0.008 | 0.006 |
| Liquidus temperature LT (° C.) | 1250 | 1260 | 1240 | 1240 | 1250 | 1250 |
| Liquidus temperature LT/(nd − 1) (° C.) | 1186 | 1198 | 1184 | 1189 | 1195 | 1197 |
| Glass transition temperature (° C.) | 721 | 743 | 734 | 721 | 737 | 738 |
| Specific gravity | 4.96 | 5.28 | 5.11 | 5.09 | 5.10 | 5.13 |
| λ70 (nm) | 547 | 469 | 481 | 477 | 483 | 480 |
| λ5 (nm) | 379 | 372 | 376 | 376 | 374 | 374 |
| Number density of crystals precipitating(crystals/kg) | 0 | 0 | 0 | 0 | 0 | 0 |

| | No. | | | | | |
|---|---|---|---|---|---|---|
| | 37 Cation % | 38 Cation % | 39 Cation % | 40 Cation % | 41 Cation % | 42 Cation % |
| $Si^{4+}$ | 9.32 | 9.14 | 9.32 | 9.14 | 9.70 | 9.32 |
| $B^{3+}$ | 18.43 | 18.07 | 18.43 | 18.07 | 19.20 | 18.43 |
| $La^{3+}$ | 28.80 | 28.24 | 28.80 | 28.24 | 29.97 | 28.80 |
| $Gd^{3+}$ | 4.18 | 4.10 | 4.18 | 4.10 | 4.35 | 4.18 |
| $Y^{3+}$ | 2.46 | 4.34 | 0.49 | 0.48 | 0.51 | 0.49 |
| $Yb^{3+}$ | 0.00 | 0.00 | 0.00 | 0.00 | 0.00 | 0.00 |
| $Ti^{4+}$ | 22.68 | 22.25 | 22.68 | 22.25 | 23.61 | 22.68 |
| $Nb^{5+}$ | 6.95 | 6.81 | 6.95 | 6.81 | 7.23 | 6.95 |
| $Ta^{5+}$ | 0.00 | 0.00 | 0.00 | 0.00 | 0.00 | 0.00 |
| $W^{6+}$ | 0.00 | 0.00 | 0.00 | 0.00 | 0.00 | 0.00 |
| $Zr^{4+}$ | 5.46 | 5.36 | 5.46 | 5.36 | 3.64 | 7.43 |
| $Zn^{2+}$ | 1.72 | 1.69 | 1.72 | 1.69 | 1.79 | 1.72 |
| $Li^{+}$ | 0.00 | 0.00 | 0.00 | 0.00 | 0.00 | 0.00 |
| $Na^{+}$ | 0.00 | 0.00 | 0.00 | 0.00 | 0.00 | 0.00 |
| $K^{+}$ | 0.00 | 0.00 | 0.00 | 0.00 | 0.00 | 0.00 |
| $Mg^{2+}$ | 0.00 | 0.00 | 0.00 | 0.00 | 0.00 | 0.00 |
| $Ca^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ge^{4+}$ | 0.00 | 0.00 | 0.00 | 0.00 | 0.00 | 0.00 |
| $Te^{4+}$ | 0.00 | 0.00 | 0.00 | 0.00 | 0.00 | 0.00 |
| $Bi^{3+}$ | 0.00 | 0.00 | 0.00 | 0.00 | 0.00 | 0.00 |
| $Al^{3+}$ | 0.00 | 0.00 | 1.97 | 3.86 | 0.00 | 0.00 |
| Total | 100.00 | 100.00 | 100.00 | 100.00 | 100.00 | 100.00 |
| $Si^{4+} + B^{3+}$ | 27.75 | 27.21 | 27.75 | 27.21 | 28.90 | 27.75 |
| $La^{3+} + Gd^{3+} + Y^{3+} + Yb^{3+}$ | 35.44 | 36.68 | 33.47 | 32.82 | 34.83 | 33.47 |
| $Ti^{4+} + Nb^{5+} + Ta^{5+} + W^{6+}$ | 29.63 | 29.06 | 29.63 | 29.06 | 30.84 | 29.63 |
| $Y^{3+}/(Gd^{3+} + Y^{3+} + Yb^{3+})$ | 0.37 | 0.51 | 0.10 | 0.10 | 0.10 | 0.10 |
| $Gd^{3+} + Y^{3+} + Yb^{3+}$ | 6.64 | 8.44 | 4.67 | 4.58 | 4.86 | 4.67 |
| $Zn^{2+}/(Ti^{4+} + Nb^{5+} + Ta^{5+} + W^{6+})$ | 0.06 | 0.06 | 0.06 | 0.06 | 0.06 | 0.06 |
| $Li^{+} + Na^{+} + K^{+}$ | 0.06 | 0.06 | 0.06 | 0.06 | 0.06 | 0.06 |
| $Mg^{2+} + Ca^{2+} + Sr^{2+} + Ba^{2+}$ | 0.37 | 0.51 | 0.10 | 0.10 | 0.10 | 0.10 |
| $Ti^{4+}/B^{3+}$ | 1.23 | 1.23 | 1.23 | 1.23 | 1.23 | 1.23 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.051 | 2.052 | 2.045 | 2.039 | 2.049 | 2.056 |
| νd | 26.4 | 26.6 | 26.4 | 26.6 | 26.1 | 26.2 |
| $P_{g,F}$ | 0.607 | 0.609 | 0.612 | 0.611 | 0.612 | 0.609 |
| $\Delta P_{g,F}$ | 0.006 | 0.009 | 0.012 | 0.010 | 0.011 | 0.008 |
| Liquidus temperature LT (° C.) | 1240 | 1270 | 1270 | 1280 | 1240 | 1260 |
| Liquidus temperature LT/(nd − 1) (° C.) | 1180 | 1208 | 1215 | 1232 | 1182 | 1193 |
| Glass transition temperature (° C.) | 741 | 739 | 735 | 728 | 732 | 724 |
| Specific gravity | 5.15 | 5.17 | 5.10 | 5.07 | 5.12 | 5.15 |
| λ70 (nm) | 478 | 476 | 490 | 500 | 493 | 500 |
| λ5 (nm) | 374 | 372 | 375 | 374 | 377 | 377 |
| Number density of crystals precipitating(crystals/kg) | 0 | 0 | 0 | 0 | 0 | 0 |

| | No. | | | | | |
|---|---|---|---|---|---|---|
| | 43 Cation % | 44 Cation % | 45 Cation % | 46 Cation % | 47 Cation % | 48 Cation % |
| $Si^{4+}$ | 9.50 | 9.50 | 9.23 | 9.32 | 9.14 | 9.14 |
| $B^{3+}$ | 18.82 | 18.81 | 18.25 | 18.43 | 18.07 | 18.07 |
| $La^{3+}$ | 29.37 | 29.37 | 28.52 | 28.80 | 28.24 | 31.56 |
| $Gd^{3+}$ | 0.00 | 2.26 | 4.14 | 4.18 | 4.10 | 4.58 |
| $Y^{3+}$ | 0.00 | 0.50 | 0.49 | 0.49 | 0.48 | 0.54 |

TABLE 1-continued

| | | | | | | |
|---|---|---|---|---|---|---|
| Yb³⁺ | 4.76 | 2.01 | 0.00 | 0.00 | 0.00 | 0.00 |
| Ti⁴⁺ | 23.14 | 23.14 | 22.46 | 22.68 | 22.25 | 22.25 |
| Nb⁵⁺ | 7.09 | 7.09 | 6.88 | 6.95 | 6.81 | 6.81 |
| Ta⁵⁺ | 0.00 | 0.00 | 0.00 | 0.00 | 0.00 | 0.00 |
| W⁶⁺ | 0.00 | 0.00 | 0.00 | 0.00 | 0.00 | 0.00 |
| Zr⁴⁺ | 5.57 | 5.57 | 5.41 | 5.46 | 5.36 | 5.36 |
| Zn²⁺ | 1.75 | 1.75 | 4.62 | 1.72 | 1.69 | 1.69 |
| Li⁺ | 0.00 | 0.00 | 0.00 | 0.00 | 0.00 | 0.00 |
| Na⁺ | 0.00 | 0.00 | 0.00 | 0.00 | 0.00 | 0.00 |
| K⁺ | 0.00 | 0.00 | 0.00 | 0.00 | 0.00 | 0.00 |
| Mg²⁺ | 0.00 | 0.00 | 0.00 | 0.00 | 0.00 | 0.00 |
| Ca²⁺ | 0.00 | 0.00 | 0.00 | 0.00 | 0.00 | 0.00 |
| Sr²⁺ | 0.00 | 0.00 | 0.00 | 0.00 | 0.00 | 0.00 |
| Ba²⁺ | 0.00 | 0.00 | 0.00 | 0.00 | 0.00 | 0.00 |
| Ge⁴⁺ | 0.00 | 0.00 | 0.00 | 1.97 | 3.86 | 0.00 |
| Te⁴⁺ | 0.00 | 0.00 | 0.00 | 0.00 | 0.00 | 0.00 |
| Bi³⁺ | 0.00 | 0.00 | 0.00 | 0.00 | 0.00 | 0.00 |
| Al³⁺ | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ | 28.32 | 28.31 | 27.48 | 27.75 | 27.21 | 27.21 |
| $La^{3+} + Gd^{3+} + Y^{3+} + Yb^{3+}$ | 34.13 | 34.14 | 33.15 | 33.47 | 32.82 | 36.68 |
| $Ti^{4+} + Nb^{5+} + Ta^{5+} + W^{6+}$ | 30.23 | 30.23 | 29.34 | 29.63 | 29.06 | 29.06 |
| $Y^{3+}/(Gd^{3+} + Y^{3+} + Yb^{3+})$ | 0.00 | 0.10 | 0.11 | 0.10 | 0.10 | 0.11 |
| $Gd^{3+} + Y^{3+} + Yb^{3+}$ | 4.76 | 4.77 | 4.63 | 4.67 | 4.58 | 5.12 |
| $Zn^{2+}/(Ti^{4+} + Nb^{5+} + Ta^{5+} + W^{6+})$ | 0.06 | 0.06 | 0.16 | 0.06 | 0.06 | 0.06 |
| $Li^+ + Na^+ + K^+$ | 0.06 | 0.06 | 0.16 | 0.06 | 0.06 | 0.06 |
| $Mg^{2+} + Ca^{2+} + Sr^{2+} + Ba^{2+}$ | 0.00 | 0.10 | 0.11 | 0.10 | 0.10 | 0.11 |
| $Ti^{4+}/B^{3+}$ | 1.23 | 1.23 | 1.23 | 1.23 | 1.23 | 1.23 |
| $W^{6+}/(Ti^{4+} + Nb^{5+} + Ta^{5+} + W^{6+})$ | 0.00 | 0.00 | 0.00 | 0.00 | 0.00 | 0.00 |
| nd | 2.051 | 2.052 | 2.050 | 2.046 | 2.039 | 2.051 |
| vd | 26.1 | 26.1 | 26.2 | 26.2 | 26.4 | 26.7 |
| $P_{g,F}$ | 0.611 | 0.610 | 0.607 | 0.611 | 0.608 | 0.606 |
| $\Delta P_{g,F}$ | 0.010 | 0.008 | 0.006 | 0.010 | 0.007 | 0.006 |
| Liquidus temperature LT (° C.) | 1240 | 1250 | 1250 | 1230 | 1220 | 1250 |
| Liquidus temperature LT/(nd − 1) (° C.) | 1180 | 1188 | 1190 | 1176 | 1174 | 1189 |
| Glass transition temperature (° C.) | 731 | 720 | 721 | 733 | 714 | 748 |
| Specific gravity | 5.21 | 5.16 | 5.15 | 5.12 | 5.10 | 5.22 |
| λ70 (nm) | 485 | 513 | 479 | 511 | 500 | 471 |
| λ5 (nm) | 377 | 376 | 375 | 376 | 374 | 372 |
| Number density of crystals precipitating(crystals/kg) | 0 | 0 | 0 | 0 | 0 | 0 |

| | No. | | | |
|---|---|---|---|---|
| | 49 Cation % | 50 Cation % | 51 Cation % | 52 Cation % |
| Si⁴⁺ | 9.91 | 5.49 | 10.46 | 10.27 |
| B³⁺ | 16.79 | 18.82 | 15.27 | 14.99 |
| La³⁺ | 27.71 | 29.37 | 26.70 | 26.22 |
| Gd³⁺ | 4.02 | 4.26 | 3.87 | 3.80 |
| Y³⁺ | 0.47 | 0.50 | 0.46 | 0.45 |
| Yb³⁺ | 0.00 | 0.00 | 0.00 | 0.00 |
| Ti⁴⁺ | 27.50 | 23.14 | 30.14 | 29.60 |
| Nb⁵⁺ | 6.69 | 7.09 | 6.44 | 6.33 |
| Ta⁵⁺ | 0.00 | 0.00 | 0.00 | 0.00 |
| W⁶⁺ | 0.00 | 0.00 | 0.00 | 1.79 |
| Zr⁴⁺ | 5.26 | 5.57 | 5.07 | 4.98 |
| Zn²⁺ | 1.65 | 1.75 | 1.59 | 1.57 |
| Li⁺ | 0.00 | 0.00 | 0.00 | 0.00 |
| Na⁺ | 0.00 | 0.00 | 0.00 | 0.00 |
| K⁺ | 0.00 | 0.00 | 0.00 | 0.00 |
| Mg²⁺ | 0.00 | 0.00 | 0.00 | 0.00 |
| Ca²⁺ | 0.00 | 0.00 | 0.00 | 0.00 |
| Sr²⁺ | 0.00 | 0.00 | 0.00 | 0.00 |
| Ba²⁺ | 0.00 | 0.00 | 0.00 | 0.00 |
| Ge⁴⁺ | 0.00 | 4.01 | 0.00 | 0.00 |
| Te⁴⁺ | 0.00 | 0.00 | 0.00 | 0.00 |
| Bi³⁺ | 0.00 | 0.00 | 0.00 | 0.00 |
| Al³⁺ | 0.00 | 0.00 | 0.00 | 0.00 |
| Total | 100.00 | 100.00 | 100.00 | 100.00 |
| $Si^{4+} + B^{3+}$ | 26.70 | 24.31 | 25.73 | 25.26 |
| $La^{3+} + Gd^{3+} + Y^{3+} + Yb^{3+}$ | 32.20 | 34.13 | 31.03 | 30.47 |
| $Ti^{4+} + Nb^{5+} + Ta^{5+} + W^{6+}$ | 34.19 | 30.23 | 36.58 | 37.72 |
| $Y^{3+}/(Gd^{3+} + Y^{3+} + Yb^{3+})$ | 0.10 | 0.11 | 0.11 | 0.11 |
| $Gd^{3+} + Y^{3+} + Yb^{3+}$ | 4.49 | 4.76 | 4.33 | 4.25 |
| $Zn^{2+}/(Ti^{4+} + Nb^{5+} + Ta^{5+} + W^{6+})$ | 0.05 | 0.06 | 0.04 | 0.04 |

TABLE 1-continued

|  |  |  |  |  |
|---|---|---|---|---|
| $Li^+ + Na^+ + K^+$ | 0.05 | 0.06 | 0.04 | 0.04 |
| $Mg^{2+} + Ca^{2+} + Sr^{2+} + Ba^{2+}$ | 0.10 | 0.11 | 0.11 | 0.11 |
| $Ti^{4+}/B^{3+}$ | 1.64 | 1.23 | 1.97 | 1.97 |
| $W^{6+}/(Ti^{4+} + Nb^{5+} + Ta^{5+} + W^{6+})$ | 0.00 | 0.00 | 0.00 | 0.05 |
| nd | 2.074 | 2.061 | 2.085 | 2.088 |
| νd | 24.6 | 26.0 | 23.8 | 23.5 |
| $P_{g,F}$ | 0.617 | 0.613 | 0.619 | 0.621 |
| $\Delta P_{g,F}$ | 0.013 | 0.012 | 0.014 | 0.015 |
| Liquidus temperature LT (° C.) | 1230 | 1230 | 1240 | 1240 |
| Liquidus temperature LT/(nd − 1) (° C.) | 1145 | 1159 | 1143 | 1139 |
| Glass transition temperature (° C.) | 724 | 724 | 732 | 726 |
| Specific gravity | 5.06 | 5.21 | 5.02 | 5.08 |
| λ70 (nm) | 490 | 498 | 493 | 499 |
| λ5 (nm) | 382 | 376 | 384 | 391 |
| Number density of crystals precipitating(crystals/kg) | 0 | 0 | 0 | 0 |

TABLE 2

| | No. | | | | |
|---|---|---|---|---|---|
| | 53 Cation % | 54 Cation % | 55 Cation % | 56 Cation % | 57 Cation % |
| $Si^{4+}$ | 4.70 | 2.60 | 9.55 | 9.34 | 9.13 |
| $B^{3+}$ | 25.61 | 28.81 | 16.18 | 15.82 | 15.48 |
| $La^{3+}$ | 27.38 | 26.28 | 26.70 | 26.09 | 25.53 |
| $Gd^{3+}$ | 4.26 | 4.26 | 3.87 | 3.79 | 3.70 |
| $Y^{3+}$ | 0.50 | 0.50 | 0.46 | 0.45 | 0.44 |
| $Yb^{3+}$ | 0.00 | 0.00 | 0.00 | 0.00 | 0.00 |
| $Ti^{4+}$ | 23.14 | 23.14 | 26.50 | 25.91 | 25.34 |
| $Nb^{5+}$ | 7.09 | 7.09 | 6.44 | 6.30 | 6.16 |
| $Ta^{5+}$ | 0.00 | 0.00 | 0.00 | 0.00 | 0.00 |
| $W^{6+}$ | 0.00 | 0.00 | 3.64 | 5.79 | 7.84 |
| $Zr^{4+}$ | 5.57 | 5.57 | 5.07 | 4.95 | 4.85 |
| $Zn^{2+}$ | 1.75 | 1.75 | 1.59 | 1.56 | 1.53 |
| $Li^+$ | 0.00 | 0.00 | 0.00 | 0.00 | 0.00 |
| $Na^+$ | 0.00 | 0.00 | 0.00 | 0.00 | 0.00 |
| $K^+$ | 0.00 | 0.00 | 0.00 | 0.00 | 0.00 |
| $Mg^{2+}$ | 0.00 | 0.00 | 0.00 | 0.00 | 0.00 |
| $Ca^{2+}$ | 0.00 | 0.00 | 0.00 | 0.00 | 0.00 |
| $Sr^{2+}$ | 0.00 | 0.00 | 0.00 | 0.00 | 0.00 |
| $Ba^{2+}$ | 0.00 | 0.00 | 0.00 | 0.00 | 0.00 |
| $Ge^{4+}$ | 0.00 | 0.00 | 0.00 | 0.00 | 0.00 |
| $Te^{4+}$ | 0.00 | 0.00 | 0.00 | 0.00 | 0.00 |
| $Bi^{3+}$ | 0.00 | 0.00 | 0.00 | 0.00 | 0.00 |
| $Al^{3+}$ | 0.00 | 0.00 | 0.00 | 0.00 | 0.00 |
| Total | 100.00 | 100.00 | 100.00 | 100.00 | 100.00 |
| $Si^{4+} + B^{3+}$ | 30.31 | 31.41 | 25.73 | 25.16 | 24.61 |
| $La^{3+} + Gd^{3+} + Y^{3+} + Yb^{3+}$ | 32.14 | 31.04 | 31.03 | 30.33 | 29.67 |
| $Ti^{4+} + Nb^{5+} + Ta^{5+} + W^{6+}$ | 30.23 | 30.23 | 36.58 | 38.00 | 39.34 |
| $Y^{3+}/(Gd^{3+} + Y^{3+} + Yb^{3+})$ | 0.11 | 0.11 | 0.11 | 0.11 | 0.11 |
| $Gd^{3+} + Y^{3+} + Yb^{3+}$ | 4.76 | 4.76 | 4.33 | 4.24 | 4.14 |
| $Zn^{2+}/(Ti^{4+} + Nb^{5+} + Ta^{5+} + W^{6+})$ | 0.17 | 0.18 | 0.16 | 0.16 | 0.16 |
| $Li^+ + Na^+ + K^+$ | 0.00 | 0.00 | 0.00 | 0.00 | 0.00 |
| $Mg^{2+} + Ca^{2+} + Sr^{2+} + Ba^{2+}$ | 0.00 | 0.00 | 0.00 | 0.00 | 0.00 |
| $Ti^{4+}/B^{3+}$ | 0.90 | 0.80 | 1.64 | 1.64 | 1.64 |
| $W^{6+}/(Ti^{4+} + Nb^{5+} + Ta^{5+} + W^{6+})$ | 0.00 | 0.00 | 0.10 | 0.15 | 0.20 |
| Specific gravity | 5.10 | | | | |
| Number density of crystals precipitating(crystals/kg) | 22 | 998 | 1451 | 10726 | 26459 |

An attempt was made to prepare the glass of Example 3 of Japanese Unexamined Patent Publication (KOKAI) Showa No. 60-33229 by the method described in that publication, but the glass devitrified and vitrification proved impossible.

Preparation Example 1 of Press-Molding Glass Gob

Press-molding glass gobs comprised of the various optical glasses of Nos. 1 to 52 were prepared in the following manner.

First, the glass starting materials were blended in a manner that would yield the various above glasses, and the blended starting material was charged to a crucible made of platinum or a platinum alloy. The blended starting material was then heated, melted, clarified, and stirred to obtain a homogeneous glass melt. Next, the glass melt was caused to flow out of an outflow pipe at a constant rate, and cast into a casting mold positioned vertically beneath the outflow pipe. A glass plate of constant thickness was molded. The molded glass plate was continuously drawn out in a horizontal direction through an opening provided in the lateral surface of the casting mold, conveyed into an annealing furnace by a belt conveyor, and gradually cooled.

The glass plate that had been gradually cooled was cut or cleaved to prepare a glass piece. These glass pieces were barrel polished to obtain press-molding glass gobs.

Press-molding glass gobs can also be prepared by the following method. A cylindrical casting mold was positioned beneath the outflow pipe. The glass melt was cast into the casting mold and molded into round, cylindrical glass. After being drawn out vertically downward at a constant rate from an opening in the bottom of the casting mold, the glass was gradually cooled and cut or cleaved into glass pieces. These glass pieces were barrel polished to obtain press-molding glass gobs.

Preparation Example 2 of Press-Molding Glass Gob

In the same manner as in Preparation Example 1 of press-molding glass gob, a glass melt was caused to flow out of an outflow pipe and the lower end of the glass melt flowing out was received in a mold. The mold was then suddenly lowered, surface tension was used to cut the glass melt flow, and a glass melt piece of prescribed weight was obtained on the mold. Gas was blown from the mold, upward air pressure was applied to the glass, and the glass piece was molded while being floated. It was then removed from the mold and annealed. The glass piece was then barrel polished to obtain a press-molding glass gob.

Preparation Example 1 of Optical Element Blank

The entire surface of each of the press-molding glass gobs obtained in Preparation Example 2 of press-molding glass gob was uniformly coated with a mold release agent comprised of boron nitride powder. The gobs were then softened by heating and press molded to prepare blanks for concave meniscus lenses, convex meniscus lenses, biconvex lenses, biconcave lenses, planoconvex lenses, planoconcave lenses, and various other lenses and prisms.

Preparation Example 2 of Optical Element Blank

A glass melt was prepared in the same manner as in Preparation Example 1 of press-molding glass gob. The glass melt was fed to the molding surface of a lower mold uniformly coated with a mold release agent in the form of a boron nitride powder, and when the quantity of the glass melt on the lower mold had reached a desired level, the glass melt flow was cut with a cutting blade.

The glass melt gob obtained on the lower mold in this manner was pressed between the upper mold and lower mold to prepare blanks for concave meniscus lenses, convex meniscus lenses, biconvex lenses, biconcave lenses, planoconvex lenses, planoconcave lenses, and various other lenses and prisms.

Preparation Example 1 of Optical Element

The various blanks fabricated in Preparation Examples 1 and 2 of optical element blank were annealed. The annealing reduced the distortion within the glass and imparted desired values to optical characteristics such as the refractive index.

Next, each of the blanks was cut and polished to prepare concave meniscus lenses, convex meniscus lenses, biconvex lenses, biconcave lenses, planoconvex lenses, planoconcave lenses, and various other lenses and prisms. It was also possible to coat the surfaces of the optical elements obtained with antireflective films.

Preparation Example 2 of Optical Element

In the same manner as in Preparation Example 1 of press-molding glass gob, glass plates and columnar glass pieces were prepared. The molded glass articles obtained were annealed to reduce distortion in the interior and impart desired values to optical characteristics such as the refractive index.

Next, each of the molded glass articles was cut, ground, and polished to prepare blanks for concave meniscus lenses, convex meniscus lenses, biconvex lenses, biconcave lenses, planoconvex lenses, planoconcave lenses, and various other lenses and prisms. It was also possible to coat the surfaces of the optical elements obtained with antireflective films.

According to an aspect of the present invention, it is possible to provide optical glass that can be stably fed, affords good glass stability, and has a high refractive index and low dispersion. Further, the above optical glass can be used to provide press-molding glass gobs, optical element blanks, and optical elements.

The implementation modes that have been disclosed herein are but examples in all regards and are not to be considered as limitations. The scope of the present invention is disclosed by the scope of the claims and not by the description given above. All modifications falling within the meaning and scope that are equivalent to the scope of the claims are intended to be covered.

The invention claimed is:

1. Optical glass, which is oxide glass, having a refractive index nd ranging from 1.95 to 2.50 and an Abbé number νd ranging from 18 to 40;
   comprising essential components in the form of $Si^{4+}$, $B^{3+}$, $La^{3+}$, $Ti^{4+}$, $Nb^{5+}$, and at least one from among $Gd^{3+}$, $Y^{3+}$, and $Yb^{3+}$;
   comprising, denoted as cation %,
   1 to 30% of $Si^{4+}$;
   and 1 to 50% of $B^{3+}$, wherein a total of $Si^{4+}$ and $B^{3+}$ ranges from 5 to 55%;
   a total of 21 to 70% of $La^{3+}$, $Gd^{3+}$, $Y^{3+}$, and $Yb^{3+}$, with 20 to 50% of $La^+$;
   total of $Ti^{4+}$, $Nb^{5+}$, $Ta^{5+}$, and $W^{6+}$ ranges from greater than 23% to 70% with equal to or greater than 1% of $Nb^{5+}$ and greater than 22% of $Ti^{4+}$; and
   0 to 6% of $Ba^{2+}$;
   wherein
      the refractive index nd and Abbé number νd satisfy the following expression: $nd \geq 2.54 - (0.02 \times v)$;
      a cation ratio of a content of $Ti^{4+}$ to a content of $B^{3+}$, $Ti^{4+}/B^{3+}$, is equal to or greater than 0.85;
      a cation ratio of a content of $Y^{3+}$ to a total content of $Gd^{3+}$, $Y^{3+}$, and $Yb^{3+}$, $Y^{3+}/(Gd^{3+}+Y^{3+}+Yb^{3+})$, is equal to or less than 0.60; and
      a cation ratio of a content of $W^{6+}$ to a total content of $Ti^{4+}$, $Nb^{5+}$, $Ta^{5+}$, and $W^{6+}$, $W^{6+}/(Ti^{4+}+Nb^{5+}+Ta^{5+}+W^{6+})$, is less than 0.10.

2. The optical glass according to claim 1, which comprises equal to or greater than 1 cation % of $Zr^{4+}$.

3. The optical glass according to claim 1, wherein a relation between a liquidus temperature LT and a refractive index nd satisfies the following expression (1):

$$LT/(nd-1) \leq 1250° C. \qquad (1).$$

4. The optical glass according to claim 1, wherein a content of $Ge^{4+}$ ranges from 0 to 6 cation %.

5. The optical glass according to claim 1, wherein a content of $Bi^{3+}$ ranges from 0 to 10 cation %.

6. The optical glass according to claim 1, which comprises essentially no Pb.

7. The optical glass according to claim 1, wherein the content of $Ba^{2+}$ falls within a range of 0% to 4%, denoted as cation %.

8. The optical glass according to claim 1, wherein the content of $La^{3+}$, $Gd^{3+}$, $Y^{3+}$, and $Yb^{3+}$, with 20 to 50% of $La^{3+}$, is in a range of from 23 to 70%, denoted as cation %.

9. A press-molding glass gob, which is comprised of the optical glass according to claim 1.

10. A method of manufacturing an optical element blank that is to be finished into an optical element by grinding and polishing, which comprises:
    softening by heating and then press molding the press-molding glass gob according to claim 9.

11. A method of manufacturing an optical element, which comprises:
    preparing an optical element blank by the method according to claim 10 and processing the optical element blank that has been prepared to obtain an optical element.

12. An optical element blank, which is comprised of the optical glass according to claim 1.

13. A method of manufacturing an optical element blank that is to be finished into an optical element by grinding and polishing, which comprises:
    melting glass starting materials by heating and press molding the glass melt that has been obtained to prepare the optical element blank according to claim 12.

14. A method of manufacturing an optical element, which comprises obtaining an optical element by processing the optical element blank according to claim 12.

15. An optical element, which is comprised of the optical glass according to claim 1.

16. A method of manufacturing optical glass, which comprises melting glass starting materials by heating, and molding the glass melt that has been obtained; and further comprises:
    blending the glass starting materials to obtain the optical glass according to claim 1; and
    conducting the melting in a glass melting vessel made of platinum or a platinum alloy.

* * * * *